United States Patent
Kwon et al.

(10) Patent No.: US 11,424,809 B2
(45) Date of Patent: Aug. 23, 2022

(54) APPARATUS AND METHOD FOR BEAM FAILURE RECOVERY

(71) Applicant: Futurewei Technologies, Inc., Plano, TX (US)

(72) Inventors: Young Hoon Kwon, San Diego, CA (US); Pengfei Xia, San Diego, CA (US); Bin Liu, San Diego, CA (US)

(73) Assignee: Futurewei Technologies, Inc., Addison, TX (US)

( * ) Notice: Subject to any disclaimer, the term of this patent is extended or adjusted under 35 U.S.C. 154(b) by 0 days.

(21) Appl. No.: 16/951,412

(22) Filed: Nov. 18, 2020

(65) Prior Publication Data
US 2021/0135735 A1 May 6, 2021

Related U.S. Application Data

(60) Continuation of application No. 16/504,228, filed on Jul. 6, 2019, now Pat. No. 10,873,381, which is a
(Continued)

(51) Int. Cl.
*H04B 7/06* (2006.01)
*H04B 7/185* (2006.01)
(Continued)

(52) U.S. Cl.
CPC ....... *H04B 7/0695* (2013.01); *H04B 7/18582* (2013.01); *H04L 5/00* (2013.01);
(Continued)

(58) Field of Classification Search
CPC .............. H04B 7/0695; H04B 7/18582; H04B 7/0617; H04B 7/0452; H04B 7/0626;
(Continued)

(56) References Cited

U.S. PATENT DOCUMENTS 10,374,683 B2   8/2019   Kwon et al.
10,873,381 B2   12/2020  Kwon et al.
(Continued)

FOREIGN PATENT DOCUMENTS

| CN | 106817762 A | 6/2017 |
| WO | 2013024942 A1 | 2/2013 |
| WO | 2017024516 A1 | 2/2017 |

OTHER PUBLICATIONS

R1-1707954 Samsung,"Discussion on beam recovery procedure",3GPP TSG RAN WG1 Meeting #89,Hangzhou, P.R. China May 15-19, 2017,total 6 pages.
(Continued)

*Primary Examiner* — Nathan S Taylor
(74) *Attorney, Agent, or Firm* — Vierra Magen Marcus LLP

(57) ABSTRACT

The disclosure relates to technology for assigning resources to user equipment for a beam failure recovery by a base station. The base station identifies a beam failure random access channel (BRACH) resource holding beam correspondence with a synchronization signal (SS) block resource covering the user equipment, and assigns the user equipment one or more BRACH preambles for each BRACH resource assigned to the user equipment, excluding the BRACH resource holding beam correspondence with the SS block resource covering the user equipment.

27 Claims, 14 Drawing Sheets

Related U.S. Application Data division of application No. 15/796,449, filed on Oct. 27, 2017, now Pat. No. 10,374,683.

(60) Provisional application No. 62/555,490, filed on Sep. 7, 2017.

(51) Int. Cl.
*H04W 56/00* (2009.01)
*H04W 74/08* (2009.01)
*H04L 5/00* (2006.01)
*H04W 16/28* (2009.01)
*H04W 72/04* (2009.01)

(52) U.S. Cl.
CPC .......... *H04L 5/0023* (2013.01); *H04L 5/0048* (2013.01); *H04L 5/0053* (2013.01); *H04W 56/003* (2013.01); *H04W 56/0005* (2013.01); *H04W 74/0833* (2013.01); *H04W 16/28* (2013.01); *H04W 72/046* (2013.01)

(58) Field of Classification Search
CPC ............ H04B 7/0848; H04W 56/0005; H04W 56/003; H04W 74/0833; H04W 16/28; H04W 72/0413; H04W 72/0446; H04W 74/008; H04W 88/02; H04W 16/14; H04W 24/10; H04W 28/0221; H04W 48/10; H04W 48/12; H04W 52/0229; H04W 52/0245; H04W 52/0274; H04W 52/146; H04W 52/18; H04W 52/242; H04W 52/36; H04W 52/367; H04W 52/48; H04W 52/50; H04W 56/001; H04W 72/005; H04W 72/04; H04W 72/044; H04W 72/0453; H04W 72/046; H04W 72/085; H04W 72/12; H04W 72/14; H04W 74/006; H04W 74/02; H04W 74/08; H04W 74/0808; H04W 74/0816; H04W 74/0891; H04W 76/28; H04W 88/08; H04N 7/0695
USPC .......................................................... 370/329
See application file for complete search history.

(56) References Cited

U.S. PATENT DOCUMENTS

| | | | |
|---|---|---|---|
| 2007/0123263 A1* | 5/2007 | Smith .................... | H01Q 1/125 455/445 |
| 2013/0010723 A1* | 1/2013 | Ouchi ................. | H04W 52/346 370/329 |
| 2014/0010178 A1* | 1/2014 | Yu ....................... | H04W 74/004 370/329 |
| 2016/0150591 A1* | 5/2016 | Tarighat Mehrabani ................... | H04L 27/18 370/329 |
| 2016/0183233 A1* | 6/2016 | Park ..................... | H04B 7/0408 370/331 |
| 2017/0231011 A1 | 8/2017 | Park et al. | |
| 2017/0251460 A1 | 8/2017 | Agiwal et al. | |
| 2017/0331670 A1* | 11/2017 | Parkvall ............... | H04J 11/0079 |
| 2018/0092064 A1* | 3/2018 | Ryu ..................... | H04L 27/2613 |
| 2018/0110066 A1* | 4/2018 | Luo .................. | H04W 72/0413 |
| 2018/0115990 A1* | 4/2018 | Abedini ............. | H04W 56/004 |
| 2018/0131434 A1* | 5/2018 | Islam .................... | H04B 7/086 |
| 2018/0138962 A1* | 5/2018 | Islam .................... | H04L 5/0032 |
| 2018/0220448 A1* | 8/2018 | Akkarakaran .... | H04W 72/0413 |
| 2018/0278310 A1* | 9/2018 | Lee ...................... | H04B 7/0645 |
| 2018/0278467 A1 | 9/2018 | Wilson et al. | |
| 2018/0279287 A1* | 9/2018 | John Wilson .......... | H04B 7/088 |
| 2018/0288756 A1* | 10/2018 | Xia ..................... | H04W 72/042 |
| 2018/0302889 A1* | 10/2018 | Guo ..................... | H04B 7/0617 |
| 2018/0331794 A1* | 11/2018 | Nagaraja .............. | H04L 5/0048 |
| 2018/0332625 A1* | 11/2018 | Tsai ...................... | H04B 7/0695 |
| 2018/0368005 A1* | 12/2018 | Fukui .................... | H04W 74/08 |
| 2018/0368009 A1* | 12/2018 | Xia ........................ | H04W 24/04 |
| 2018/0368126 A1* | 12/2018 | Islam .................... | H04L 5/1469 |
| 2018/0368142 A1 | 12/2018 | Liou | |
| 2019/0021071 A1* | 1/2019 | Islam .................... | H04W 72/04 |
| 2019/0037604 A1* | 1/2019 | Akkarakaran ...... | H04W 74/006 |
| 2019/0052337 A1* | 2/2019 | Kwon ................. | H04W 72/085 |
| 2019/0052339 A1* | 2/2019 | Zhou ...................... | H04B 17/17 |
| 2019/0053071 A1* | 2/2019 | Ly ........................ | H04B 7/0617 |
| 2019/0053193 A1* | 2/2019 | Park ..................... | H04L 5/0057 |
| 2019/0053288 A1* | 2/2019 | Zhou ................... | H04W 74/006 |
| 2019/0053313 A1* | 2/2019 | Zhou .................. | H04W 52/146 |
| 2019/0075014 A1* | 3/2019 | Zhou .................. | H04W 72/042 |
| 2019/0132066 A1* | 5/2019 | Park ............... | H04W 36/00835 |
| 2019/0319686 A1* | 10/2019 | Chen, IV ............... | H04B 7/088 |

OTHER PUBLICATIONS

Communication Pursuant to rule 164(1) EPC dated Jun. 17, 2020, EP Application No. 18854993.5.
International Search Report dated Nov. 2, 2018 in PCT Application No. PCT/CN2018/100216, 9 pages.
Office Action dated Jan. 2, 2019 in U.S. Appl. No. 15/814,372.
Response to Office Action filed Feb. 25, 2019 in U.S. Appl. No. 15/815,658.
Response to Office Action filed Apr. 2, 2019 in U.S. Appl. No. 15/814,372.
R1-1717813 CATT, "Consideration on beam failure recovery", 3GPP TSG RAN WG1 Meeting 90bis, Oct. 9-13, 2017 (Year:2017).
R1-1717606 Samsung, "Beam failure recovery", 3GPP TSG RAN WG1 Meeting 90bis, Oct. 9-13, 2017 (Year: 2017).
R1-1717473 VIVO, "Discussion on beam failure recovery", 3GPP TSG RAN WG1 Meeting 90bis, Oct. 9-13, 2017 (Year: 2017).
R1-1717302 Huawei, "Beam failure recovery design details", 3GPP TSG RAN WG1 Meeting 90bis, Oct. 9-13, 2017 (Year: 2017).
Notice of Allowance dated Jun. 18, 2019 in U.S. Appl. No. 15/815,658.
Draft Report of 3GPP TSG RAN WG1 Meeting #89 v0.2.0, Hangzhou, China, May 15-19, 2017, 166 pages.
Final Report of 3GPP TSG RAN WG1 Meeting #88bis v1.0.0, Spokane, USA, Apr. 3-7, 2017, 154 pages.
Restriction Requirement dated Dec. 21, 2018, U.S. Appl. No. 15/796,449.
Notice of Allowance, dated Mar. 26, 2019, U.S. Appl. No. 15/796,449.
Response to Restriction Requirement, dated Feb. 11, 2019, U.S. Appl. No. 15/796,449.
Office Action, dated Nov. 1, 2018, U.S. Appl. No. 15/815,658.
Office Action dated Oct. 31, 2019 in U.S. Appl. No. 16/504,228.
Response to Office Action filed Apr. 2, 2020 in U.S. Appl. No. 16/504,228.
Notice of Allowance dated Apr. 15, 2020 in U.S. Appl. No. 16/504,228.
Request for Continued Examination and Response filed Jul. 13, 2020 in U.S. Appl. No. 16/504,228.
Supplemental Response filed Jul. 14, 2020 in U.S. Appl. No. 16/504,228.
Amendment Under 312 filed Oct. 13, 2020 in U.S. Appl. No. 16/504,228.
Notice of Allowance dated Aug. 19, 2020 in U.S. Appl. No. 16/504,228.
Response to Rule 312 Communication dated Oct. 27, 2020 in U.S. Appl. No. 16/504,228.
Ericsson, "Mechanism to recover from beam failure", 3GPP TSG-RAN WG1 #89ah-NR, R1-1711017, Qingdao, China, Jun. 27-30, 2017, 7 pages.
Huawei et al.,"Procedure Details for Beam Failure Recovery", 3GPP TSG RAN WGl Meeting #90, R1-1712224, Prague, Czech Republic, Aug. 21-25, 2017, 12 pages.
Xinwei, "Considerations on Beam Management for NR", 3GPP TSG RAN WG1 Meeting #86, R1-166583, Gothenburg, Sweden, Aug. 22-26, 2016, 6 pages.

(56) References Cited

OTHER PUBLICATIONS

Office Action dated Sep. 22, 2021, Chinese Application No. 201880056655.7, 6 pages.

* cited by examiner

| (N, K) | (64, 2) | (64, 3) | (64, 4) | (64, 6) | (64, 8) | (128, 2) | (128, 3) | (128, 4) | (128, 6) | (128, 8) |
|---|---|---|---|---|---|---|---|---|---|---|
| Min # UE allocated | 92 | 72 | 69 | 65 | 64 | 204 | 157 | 146 | 135 | 130 |
| Max # UE allocated | 128 | 96 | 85 | 76 | 72 | 256 | 192 | 170 | 153 | 145 |
| Ave # UE allocated | 120.08 | 89.45 | 79.57 | 71.93 | 68.75 | 244.26 | 182.54 | 162.29 | 146.47 | 139.82 |
| Ave. gain | 87.6% | 39.8% | 24.3% | 12.4% | 7.4% | 90.8% | 42.6% | 26.8% | 24.4% | 9.2% |

FIG. 7

|  | BRACH#1 (CRI#1, 2) | BRACH#2 (CRI#3, 4) | BRACH#3 (CRI#5, 6) | BRACH#4 (CRI#7, 8) |
|---|---|---|---|---|
| UE1 | N/A, Preamble#1 | Preamble#1, 2 | Preamble#1, 2 | Preamble#1, 2 |
| UE2 | Preamble#2, N/A | Preamble#3, 4 | Preamble#3, 4 | Preamble#3, 4 |
| UE3 | Preamble#3, 4 | N/A, Preamble#5 | Preamble#5, 6 | Preamble#5, 6 |
| UE4 | Preamble#5, 6 | Preamble#6, N/A | Preamble#7, 8 | Preamble#7, 8 |
| UE5 | Preamble#7, 8 | Preamble#7, 8 | N/A, Preamble#9 | Preamble#9, 10 |
| UE6 | Preamble#9, 10 | Preamble#9, 10 | Preamble#10, N/A | Preamble#11, 12 |
| UE7 | Preamble#11, 12 | Preamble#11, 12 | Preamble#11, 12 | N/A, Preamble#13 |
| UE8 | Preamble#13, 14 | Preamble#13, 14 | Preamble#13, 14 | Preamble#14, N/A |

*FIG. 9C*

APPARATUS AND METHOD FOR BEAM FAILURE RECOVERY

CLAIM FOR PRIORITY

This application is a continuation of U.S. patent application Ser. No. 16/504,228, filed Jul. 6, 2019 which is a divisional of U.S. patent application Ser. No. 15/796,449, filed Oct. 27, 2017, now U.S. Pat. No. 10,374,683, issued Aug. 6, 2019, which claims benefit of U.S. Provisional Application No. 62/555,490, filed Sep. 7, 2017, and the entire contents of which are hereby incorporated by reference.

FIELD

The disclosure generally relates to wireless communication networks, and in particular, to assigning resources to user equipment for a beam failure recovery by a base station.

BACKGROUND

As the demand for capacity in mobile broadband communications increases drastically every year, wireless communication systems are increasing their capability of handling mobile traffic. In next generation systems, such as fifth generation (5G) technologies, advanced communications, such as millimeter-wave (mm-wave) communications, with potential multigigabit-per-second data rates are candidate technologies to increase overall capacity and transmission speeds. Highly directional beamforming antennas are necessary at both the base station (BS) and mobile station (MS) to compensate for the high attenuation in the mm-wave frequency band and to extend its transmission range.

A misalignment between transmitting (Tx) and receiving (Rx) beams may cause a significant loss in the received power, especially for systems with narrow beams, and result in beam failure. To avoid such beam failure, beam alignment in mm-wave communication systems is necessary to find the best beam pair from all possible beam pairs for maximum beamforming efficiency. However, when a beam failure occurs, a reporting and recovery mechanism is employed to report and recover from the failure. During the 3GPP TSG RAN WG1 #89, it was agreed upon to support a non-contention based channel based on the Physical Random Access Channel (PRACH) and the Physical Uplink Control Channel (PUCCH) for beam failure recovery request transmission. PRACH denotes a Long Term Evolution (LTE) uplink channel transmitted by a terminal so as to establish initial synchronization, whereas PUCCH denotes an LTE uplink control channel, and may include Channel Quality Indicator (CQ) information.

BRIEF SUMMARY

According to one aspect of the present disclosure, there is provided a method for assigning resources to user equipment for a beam failure recovery by a base station, including identifying a beam failure random access channel (BRACH) resource holding beam correspondence with a synchronization signal (SS) block resource covering the user equipment; and assigning the user equipment one or more BRACH preambles for each BRACH resource assigned to the user equipment, excluding the BRACH resource holding beam correspondence with the SS block resource covering the user equipment.

Optionally, in any of the preceding aspects, the method further including transmitting one or more of the SS block resources, where each of the SS block resources has a different beam direction.

Optionally, in any of the preceding aspects, the BRACH resource supports $N*K/(K-1)$ user equipment, where N is a number of user equipment and K is a number BRACH resources with different beams.

Optionally, in any of the preceding aspects, when the user equipment has more than one SS block resource in use, the base station does not assign a BRACH preamble for the user equipment on the BRACH resources holding beam correspondence with the SS block resources in use.

Optionally, in any of the preceding aspects, the method further including receiving a beam failure recovery request (BFRR) from the user equipment, including identification of a different SS block resource as a new candidate beam, upon detection of a beam failure between the base station and the user equipment; and identifying the new candidate beam upon receiving a BRACH preamble assigned for the user equipment at the BRACH resource.

According to one other aspect of the present disclosure, there is provided a device for assigning resources to user equipment for a beam failure recovery by a base station, including a non-transitory memory storage comprising instructions; and one or more processors in communication with the memory, wherein the one or more processors execute the instructions to identify a beam failure random access channel (BRACH) resource holding beam correspondence with a synchronization signal (SS) block resource covering the user equipment; and assign the user equipment one or more BRACH preambles for each BRACH resource assigned to the user equipment, excluding the BRACH resource holding beam correspondence with the SS block resource covering the user equipment.

According to one other aspect of the present disclosure, there is provided a non-transitory computer-readable medium storing computer instructions for assigning resources to user equipment for a beam failure recovery by a base station, that when executed by one or more processors, cause the one or more processors to perform the steps of configuring one or more new beam identification reference signals; identifying the new beam identification reference signal corresponding to the current beam for the user equipment; and assigning one or more resources to each of the new beam identification reference signals excluding new beam identification reference signal corresponding to the current beam of the user equipment.

According to still one other aspect of the present disclosure, a method for a beam failure recovery, comprising identifying a current beam serving the user equipment; monitoring a signal quality of the current beam to identify when the signal quality falls below a first threshold value; identifying a new beam identification reference signal corresponding to the current beam; identifying a new beam having a signal quality above a second threshold value from one or more new beam identification reference signals, excluding the new beam identification reference signal corresponding to the current beam; and transmitting a beam failure recovery request (BFRR) on a beam failure random access channel BRACH resource corresponding to the identified new beam.

Optionally, in any of the preceding aspects, the method further including the one or more processors further perform the steps of assigning one or more a beam failure random access channel (BRACH) resources, where spatial domain of each of the BRACH resource covers spatial domain of a subset of the one or more new beam identification reference signals.

Optionally, in any of the preceding aspects, the method further including a number of the resources is less than a number of the new beam identification reference signals.

Optionally, in any of the preceding aspects, the method further including the one or more processors further perform the steps of transmitting the one or more new beam identification reference signals, where each of the new beam identification reference signals has a different beam direction.

Optionally, in any of the preceding aspects, the method further including the one or more processors further perform the steps of categorizing the one or more BRACH resources into first and second groups, wherein the first group of the one or more BRACH resources does not cover a spatial domain of the current beam; and the second group of the one or more BRACH resources covers a spatial domain of at least one current beam.

Optionally, in any of the preceding aspects, the method further including spatial domain of each of the one or more BRACH resources includes spatial domain of one or more new beam identification reference signal beam resources.

Optionally, in any of the preceding aspects, the method further including for the second group of the BRACH resource, the one or more processors further perform the steps of assigning the user equipment the one or more resources within the BRACH resource, wherein a number of resources corresponds to a number of new beam identification reference signal beam resources within the second group of the BRACH resource that is not the current beam.

Optionally, in any of the preceding aspects, the method further including receiving a beam failure recovery request (BFRR) from the user equipment, including identification of a different resource as a new candidate beam, upon detection of a beam failure between the base station and the user equipment; and identifying the new candidate beam upon receiving a beam failure random access channel (BRACH) preamble assigned for the user equipment at a BRACH resource.

Optionally, in any of the preceding aspects, the method further including the BRACH resource supports N*(K/(K−1)) user equipment, where N is a number of user equipment and K is a number of BRACH resources with different beams.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 7 illustrates an example capacity comparison between conventional resource assignment and resource assignment according to embodiments of the disclosure.

FIG. 9C illustrates allocation of BRACH preambles as resources for each user equipment when employing reference beam identification.

DETAILED DESCRIPTION

The disclosure relates to technology for recovering from a beam failure between user equipment and a base station.

User equipment and base stations establish connections using downlink (DL) and uplink (UL) beam pairs. Often times, for example as a result of blockage or user equipment rotation or displacement, the connection between the user equipment and the base station is disrupted, resulting in a beam failure. To overcome such failure, a beam failure recovery mechanism may help to improve high frequency link performance. In particular, a beam failure recovery request (BFRR) method based on a PRACH-like (e.g., different parameters for a preamble sequence from PRACH) channel is disclosed in which a UE's new beam index is identified in a BFRR. Accordingly, the system overhead for indicating the new beam index can be significantly reduced when the serving base station (such as a gNB) has multiple radio frequency (RF) chains. In one embodiment, the system overhead for indicating the new beam index may be adaptively adjusted depending on different base station's RF chain configurations.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1:
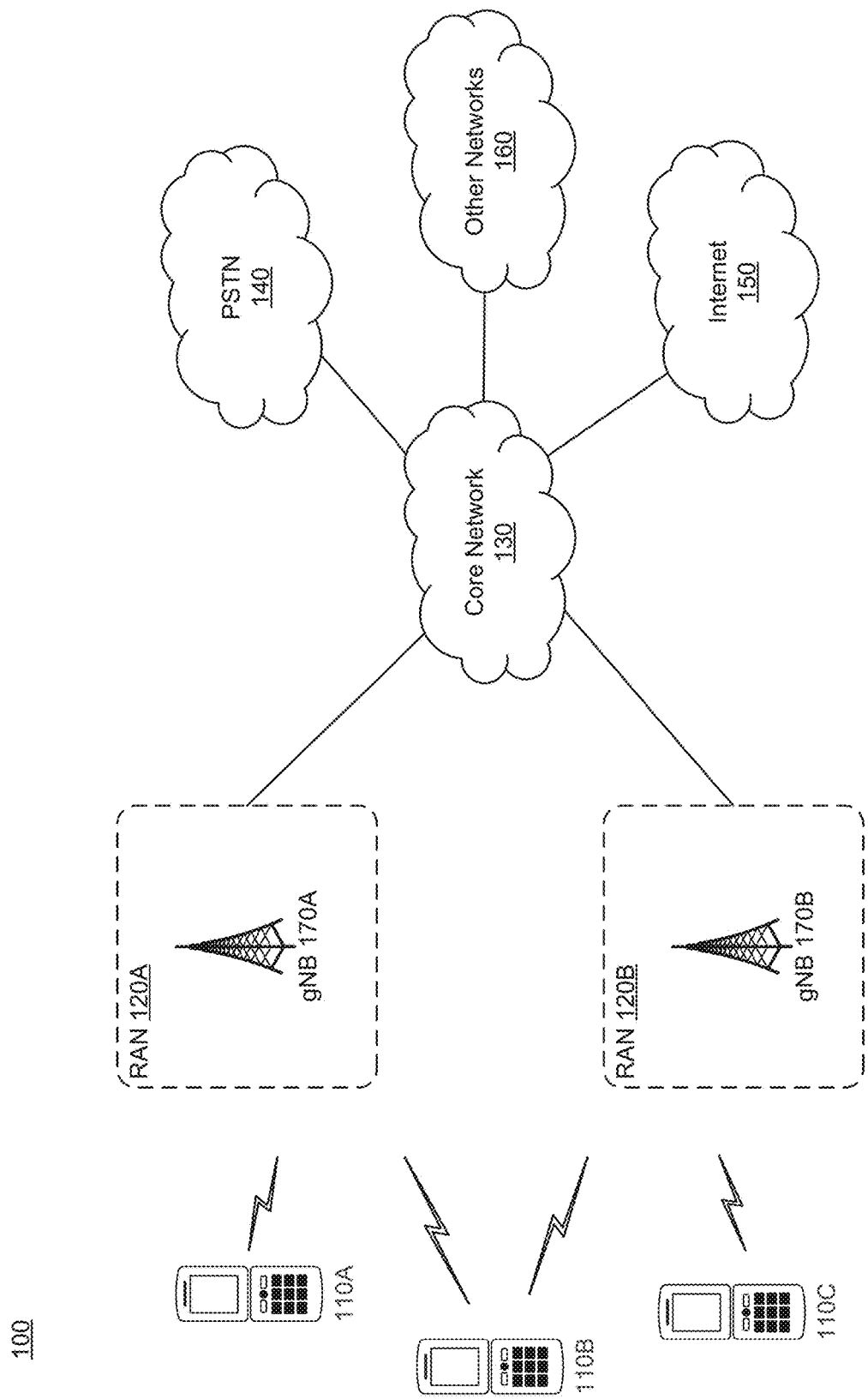
FIG. 1 illustrates a wireless network for communicating data.

FIG. 1 illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Broadcast (LTE-B). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (a mmW CP) or a base station 170 capable of mmW communication (e.g., a mmW base station). The mmW APs may transmit and receive signals in a frequency range, for example, from 6 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 2:
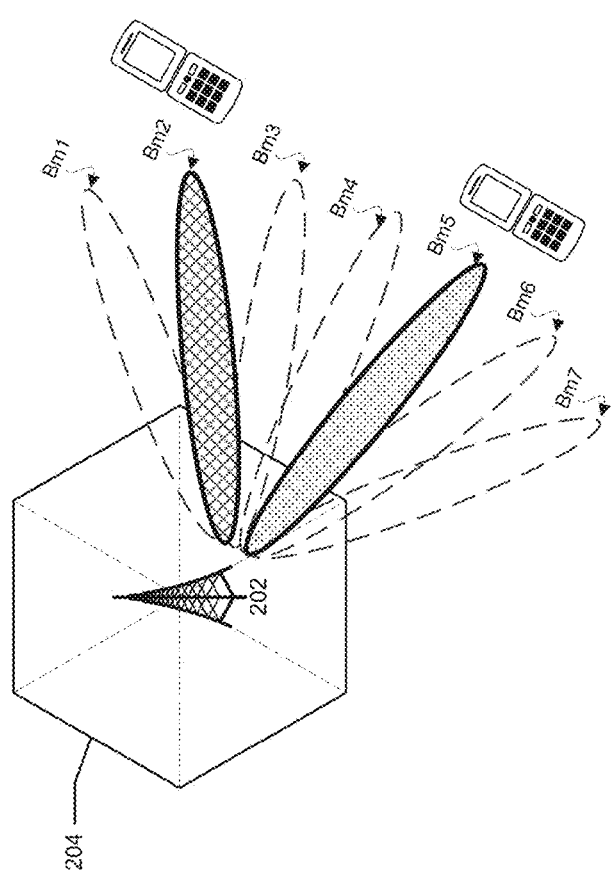
FIG. 2 illustrates a base station with transmitting and receiving beams according to an example embodiment.

FIG. 2 illustrates a base station with transmitting and receiving beams according to an example embodiment. The base station 202 manages a cell 204 divided into one or more sectors as its service coverage area and forms multiple transmit/receive (Tx/Rx) beams BM1-BM7 using beamforming schemes, such as digital beamforming (e.g., Transmit (Tx) pre-Inverse Fast Fourier Transform (pre-IFFT) beamforming/Receive (Rx) post-Fast Fourier Transform (post-FFT) beamforming), analog beamforming (e.g., Tx post-IFFT beamforming/Rx pre-FFT beamforming), or a combination thereof. The base station 202 transmits the beamformed signals by sweeping them simultaneously or successively, for example, beginning with beam BM1 and ending with BM7.

User equipment (UE), such as user equipment 110A-110C (FIG. 1), located within the cell of the base station 202 may be configured to receive signals omni-directionally without supporting Rx beamforming, receive signals while supporting Rx beamforming by using one beamforming pattern each time, or receive signals while supporting Rx beamforming by simultaneously using a plurality of beamforming patterns in different directions.

If the user equipment 110A-110C does not support Rx beamforming, the user equipment 110A-110C measures the channel quality of a reference signal (RS) in each transmission beam and reports the measurements to the base station 202. The station 202 selects the best beam for the user equipment 110A-110C from among a plurality of Tx beams. If the user equipment 110A-110C is configured to support Rx beamforming, the user equipment 110A-110C measures the channel qualities of multiple Tx beams received from the base station 202 for each reception beam pattern and reports a total or some high-ranked measurements of all Tx-Rx beam pairs to the base station 202. The base station 202 may allocate an appropriate Tx beam to the user equipment 110A-110C. If the user equipment 110A-110C is capable of receiving a plurality of Tx beams from the base station 202 or supporting a plurality of base station Tx-user equipment Rx beam pairs, the base station 202 may select a beam, taking into account diversity transmission through repeated transmission or simultaneous transmission.

Figure 3:
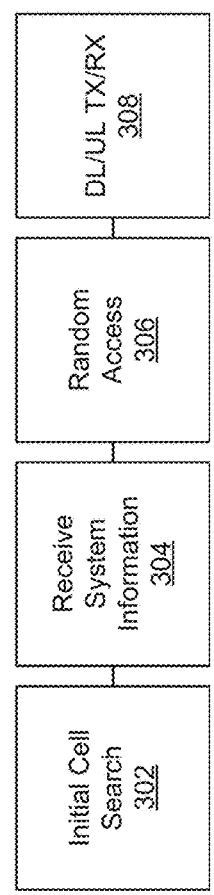
FIG. 3 illustrates physical channels and transmitting signals on the physical channels in accordance with FIG. 2.

FIG. 3 illustrates physical channels and transmitting signals on the physical channels in accordance with FIG. 2. When user equipment 110A-110C (FIG. 1) is powered on or enters a new cell, such as cell 204 (FIG. 2), the user equipment performs an initial cell search 302. The initial cell search 302 involves acquisition of synchronization to a base station, such as gNB 202. Specifically, the user equipment synchronizes its timing to the gNB and acquires a cell Identifier (ID) and other information by receiving a Primary Synchronization Channel (P-SCH) and a Secondary Synchronization Channel (S-SCH) from the gNB 202. Subsequently, the user equipment may acquire information broadcast in the cell by receiving a Physical Broadcast Channel (PBCH) from the gNB 202. During the initial cell search, the user equipment may monitor a downlink (DL) channel state by receiving a downlink reference Signal (DL RS).

After the initial cell search, the user equipment 110A-110C may acquire detailed system information at 304 by receiving a Physical Downlink Control Channel (PDCCH) and receiving a Physical Downlink Shared Channel (PDSCH) based on information included in the PDCCH.

If the user equipment 110A-110C initially accesses the gNB 202 or has no radio resources for signal transmission to the gNB 202, the user equipment 110A-110C may perform a random access procedure at 306 with the gNB 202. During the random access procedure 306.

Upon completion of the above process, the user equipment 110A-110C may receive a PDCCH and/or a PDSCH from the gNB 202 and transmit a Physical Uplink Shared Channel (PUSCH) and/or a PUCCH to the gNB 202, which is a general DL and UL signal transmission procedure at 308. Specifically, the user equipment 110A-110C receives Downlink Control Information (DCI) on a PDCCH. The DCI includes, for example, control information such as resource allocation information for the user equipment 110A-110C.

Control information that the user equipment 110A-110C transmits to the gNB 202 on the uplink (UL) channel or receives from the gNB 202 on the DL channel includes a DL/UL ACKnowledgment/Negative ACKnowledgment (ACK/NACK) signal, a Channel Quality Indicator (CQI), a Precoding Matrix Index (PMI), a Rank Indicator (RI), etc. The control information, such as a CQ, a PMI, an RI, etc., may be transmitted on a PUSCH and/or a PUCCH.

Figure 4:
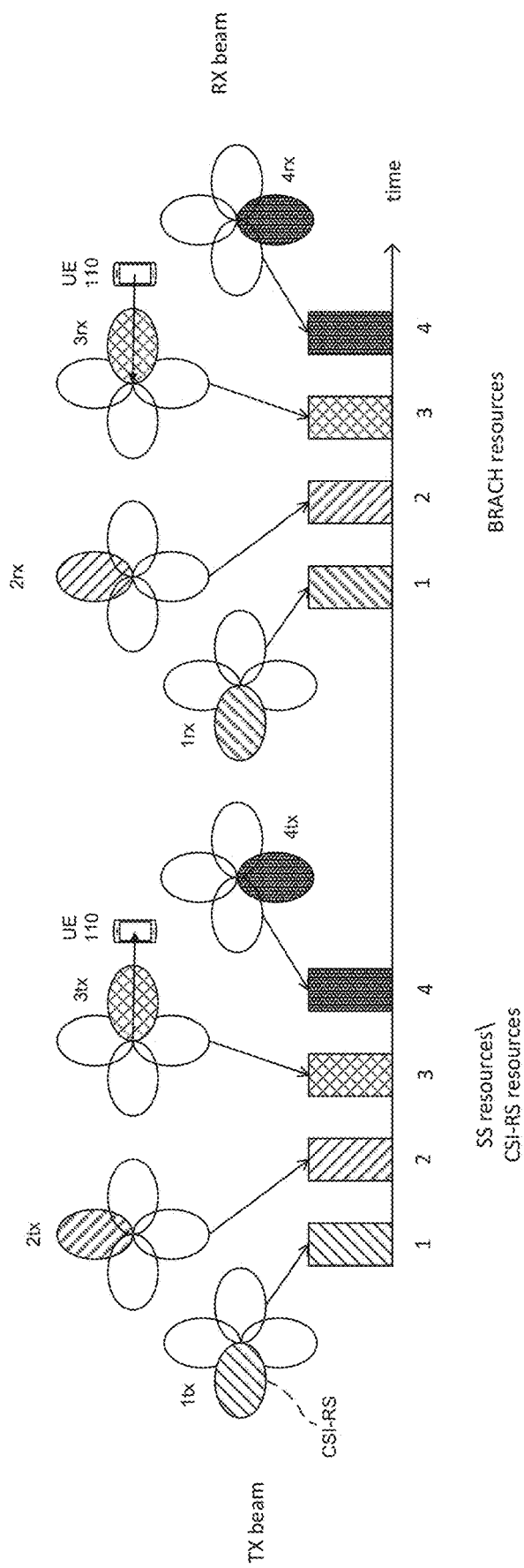
FIG. 4 illustrates an example of identifying a new beam when a beam failure is detected.

FIG. 4 illustrates an example of identifying a new beam when a beam failure is detected. As illustrated, a gNB has transmit beams 1tx-4tx aligned with reference signal resources 1-4 and receive beams 1rx-4rx aligned with beam failure random access control channel (BRACH) resources 1-4. As used herein, a BRACH denotes a non-contention based channel that is based on a physical random access channel (PRACH)-like (that is, the physical layer channel structure for beam failure report may be different from PRACH) for a beam failure report (the resources for a beam failure are non-contention based—i.e., dedicated).

The UE 110 is responsible for regularly and periodically monitoring reference signals RSs for beam failure detection to determine whether a beam failure has been detected. For example, the UE 110 measures reception quality of the reference signals RSs for beam failure detection, in this case the reference signals for beam failure detection are the Channel State Information-Reference Signals (CSI-RSs), transmitted from the respective antenna ports in the base stations. It is appreciated that the reference signal for beam failure detection transmitted in a beam is not limited to the CSI-RS and may be a PSS (Primary Synchronization Signal), a SSS (Secondary Synchronization Signal), an Enhanced SS, a Discovery signal, a DM-RS (Data Demodulation-Reference Signal) or the like.

In one other embodiment, a synchronization signal (SS)-block within the serving cell may be monitored to determine whether a beam failure has been detected.

Once a beam failure has been detected by the UE 110, a new candidate beam is identified by the UE 110 by monitoring the reference signal for new beam identification and selecting a beam 1tx-4tx having good reception quality based on the measured reception quality. In one embodiment, the reference signal for new beam identification is a CSI-RS. In another embodiment, the reference signal for new beam identification is a SS block. In one other embodiment, beam identification includes the UE 110 monitoring each of the beam resources (periodic CSI-RS). In another embodiment, beam identification includes the UE 110 monitoring the beam resources (periodic CSI-RS) and SS resources (blocks) within the serving cell (not shown).

Once the UE 110 has detected a beam failure and selected the new candidate beam, the UE 110 sends a beam failure recovery request (BFRR) transmission to the base station (such as gNB 202). To send the BFRR, the gNB may configure each UE 110 with unique BRACH preamble(s) within a BRACH region before the UE 110 transmits the BFRR. That is, the gNB may schedule a channel to report beam failure (i.e. the BRACH) and inform the UE 110. Scheduling a BRACH by the gNB 202 is discussed further below.

The UE 110, in the case of a beam recovery, may then use the BRACH preamble(s) to send the BFRR. In one embodiment, the gNB may send out multiple SSs in a one or more resources with different beamforming of SSs on different resources. That is, the gNB 202 may send out multiple resources using different beams within different time frames, as depicted in FIG. 4.

In another embodiment, the gNB 202 may schedule multiple BRACH resources in the time domain. Thus, the gNB 202 may signal a fixed relationship between a BRACH resource and an SS resource. For example, each of the SS resources (SS resources 1-4) have a corresponding Rx beamforming of each of the BRACH resources (BRACH resources 1-4), such that a one-to-one association exists (e.g., with reference to the figure, the Tx beam of SS 1 resource holds a beam correspondence relationship with the Rx beam of the BRACH resource 1). For example, a Tx beam of a first resource and an Rx beam of a second resource from a gNB hold beam correspondence if (1) a Tx beam of a first resource covers a similar area with an Rx beam of a second resource, or (2) the gNB indicates a spatial quasi co-located (SQCL'ed) relationship between a Tx beam of a first resource and an Rx beam of a second resource. In this manner, two antenna ports are said to be SQCL'ed if large-scale properties of a radio channel over which a symbol on one antenna port is conveyed can be inferred from a radio channel over which a symbol on the other antenna port is conveyed. The large-scale properties may include, for example, delay spread, Doppler spread, Doppler shift, average gain, and average delay.

In the depicted example, and for purposes of discussion, SS resources are used as reference signals for new beam identification, and there are four (4) SS resources and four (4) BRACH resources, where each of the Tx beams 1*tx*-4*tx* for the SS resources and each of Rx beams 1*rx*-4*rx* for the BRACH resources 1-4 respectively hold beam correspondence. It is understood that the disclosed embodiment is non-limiting and that any number of configurations of UEs, base stations, Tx beams, Rx beams, SS resources, CSI-RS resources and BRACH resources may be employed.

In the example, when a UE 110 measures the SS resources 1-4, the UE 110 identifies the SS resource 3 as having the highest received signal quality. (The received signal quality can be measured in various ways such as reference signal received power (RSRP) (RSRP may be measured using conventional techniques), or signal-to-noise ratio of the received reference signal). Subsequently, when the UE 110 transmits previously assigned BRACH preambles (as scheduled by the gNB 202) to all BRACH resources 1-4, the gNB 202 receives the preamble with the highest received power on BRACH resource 3, which was identified by UE 110 as having the highest RSRP. In another example, the UE 110 transmits a previously assigned BRACH preamble to the BRACH resource corresponding to the SS resource that the UE 110 has identified as having the highest received signal quality. In this case, the gNB 202 receives the BRACH preamble from UE 110 only on BRACH resource 3.

Figure 5:
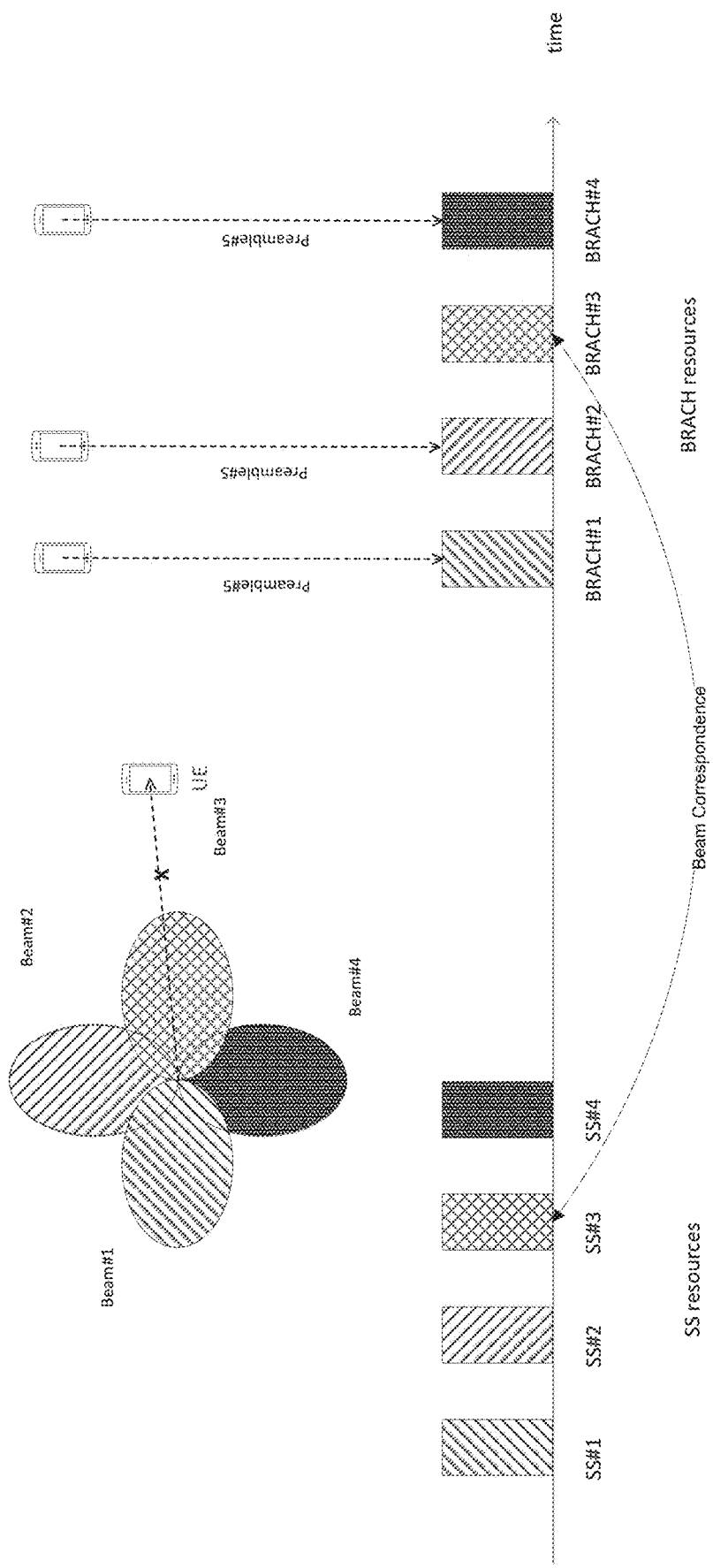
FIG. 5 illustrates an example of BRACH resource allocation in accordance with the description of FIG. 4.

FIG. 5 illustrates an example of BRACH resource allocation in accordance with the description of FIG. 4. As described above, BRACH supports use of a non-contention based channel, where each UE 110 uses a dedicated BRACH preamble. Assuming for purposes of discussion that BRACH uses the current PRACH structure, there are 64 BRACH preambles supported in each BRACH resource (BRACH #1-BRACH #4). Thus, if more than 64 UEs 110 are covered by a single base station's (e.g., a gNB's 202) coverage area, one BRACH resource is not sufficient to handle the UEs 110 in the coverage area.

When one BRACH resource is not sufficient to handle the UEs 110 in the coverage area, more than one BRACH resource needs to be allocated for each beam direction. Furthermore, if more than one BRACH preamble is assigned for each UE 110, the number of UEs 110 supported in each BRACH resource becomes even smaller. For example, if SS beam #1 includes two CSI-RS signals, then the gNB 202 will allocate two preambles to the SS beam #1 for each UE 110—one for each CSI-RS signal in the SS beam. Accordingly, where 'N' CSI-RS beams are included in each SS beam, a single BRACH resource for each beam can support up to 64/N UEs (assuming the current PRACH structure is being utilized). This results in the resources not being used efficiently, even though more than one BRACH resource for each beam is allocated, since the probability of a beam failure occurring is low.

In the following non-limiting example, with reference to the figure, there are four SS resources (SS #1-SS #4) and four BRACH resources (BRACH #1-BRACH #4). A gNB's 202 transmit (Tx) beam for each of the SS resources SS #1-SS #4 and gNB's 202 receive (Rx) beam for each of the BRACH resources (Beam #1-Beam #4) respectively have identical beam patterns such that beam correspondence holds between them. Beam correspondence generally refers to a downlink (DL) beam and an uplink (UL) beam being linked. For example, the transmit beam for SS #3 holds beam correspondence with (is linked with) the receive beam for BRACH resource (BRACH #3). Additionally, in the example, the SS resources (SS #1-SS #4) are used as a beam failure detection reference signal (RS) and for identification of a new candidate beam RS. The UE 110 is currently using Beam #3 and the gNB 202 assigns BRACH preamble #5 to the UE 110 for a BFRR transmission, as illustrated.

While a link exists between the UE 110 and the gNB 202, the UE 110 measures the beam failure detection RS (SS resources) to detect when a beam failure occurs. When the UE 110 determines that a beam failure has occurred, the UE 110 identifies the new candidate beam. Identification of a new candidate beam may be determined, for example, by selecting one of the beams (not including the failed beam) with the highest quality, as determined by measuring the new beam identification RS (SS resources). For example, the UE's 110 new candidate beam can be one of Beam #1, Beam #2 and Beam #4. Any one of these beams may be selected as the new candidate beam based on the measured quality of the each beam. In this case, Beam #3 may not be used as the new candidate beam since Beam #3 is the beam (old beam) on which the beam failure occurred.

Following selection of the new beam candidate, the UE 110 sends BRACH preamble #5 (previously assigned by the gNB 202) on a BRACH resource that corresponds to the new candidate beam. For example, if the UE's 110 new candidate beam is k, the UE 110 sends the BRACH preamble #5 at the kt BRACH resource. However, since Beam #3 may not be chosen as the new candidate beam (as it has failed), BRACH #3 will not be utilized. Therefore, the BRACH preamble (in this case BRACH preamble #5) corresponding to the failed beam (in this case Beam #3) remains unused and is wasted.

To overcome this inefficiency, the gNB 202 assigns a group of resources (preambles) to a UE 110 for transmission of the BFRR within the BRACH resources, where the group of resources excludes resources that correspond to beam(s) that the UE 110 is currently using (namely, the old beam).

Figures 6A, 6B:
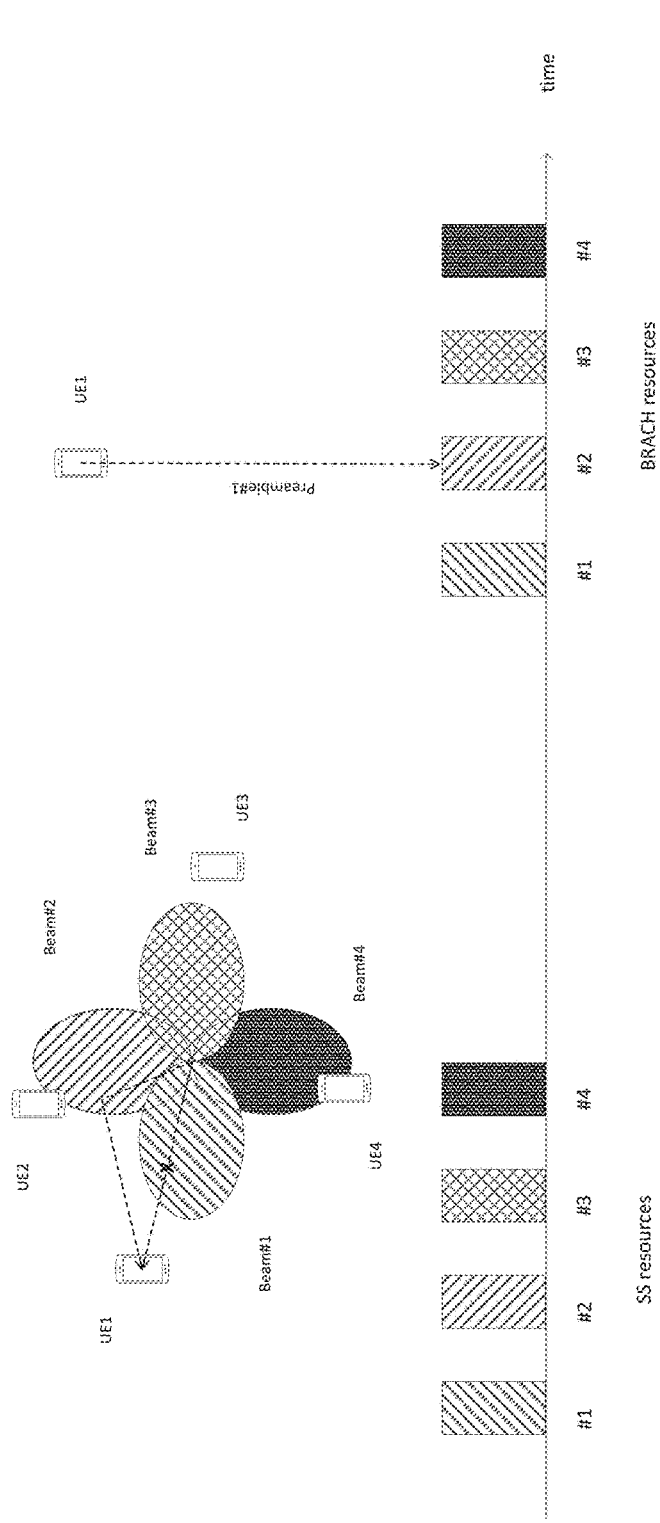
FIGS. 6A and 6B illustrate an example of resource allocation using synchronization signal based identification.

FIGS. 6A and 6B illustrate an example of resource allocation using synchronization signal based identification. In the disclosed embodiments, the procedures are implemented by one of the base station and/or user equipment. However, it is appreciated that the procedure may be implemented by any component or device disclosed in any one or more of the figures, and that the disclosed embodiments are non-limiting.

In the example that follows, it is assumed that SS resources (SS #1-SS #4) are used for beam failure detection and as a new candidate beam identification RS.

During operation, and before beam failure occurs, the gNB 202 transmits multiple SS resources (SS #1-SS #4), where each of the SS resources have a different beam direction (indicated by the various patterns). The gNB 202 also assigns multiple BRACH resources (BRACH #1-BRACH #4) such that the transmit beamforming of each SS resource, and the receive beamforming of each BRACH resource, hold beam correspondence. For example, SS resource SS #1 holds beam correspondence with BRACH resource BRACH #1, SS resource SS #2 holds beam correspondence with BRACH resource BRACH #2, etc.

The UE 110 measures SS resources to identify an SS resource (SS_old) with the best signal quality. For example, the best signal quality may be, but is not limited to, a beam with the strongest received signal power (RSRP), a beam with the highest signal-to-noise ratio (RSRQ), a beam with the strongest received signal power averaged in time, a beam with the highest signal-to-noise ratio averaged in time, etc. The identified SS resource (SS_old) with the best signal quality is used as the current beam. Subsequently, the gNB 202 then assigns the UE 110 a BRACH preamble for each BRACH resource, except the BRACH resource that holds beam correspondence with the current beam (SS_old). In one embodiment, the BRACH preamble assigned to the UE 110 on a different BRACH resource does not need to be the same.

When the UE 110 identifies a beam failure, another one of the SS resources (SS_new) is identified as the new candidate beam. That is, the UE 110 determines the new candidate beam to replace the failed beam. For example, the SS resource (except for SS_old) with the best signal quality will be identified as the new candidate beam. Once the new candidate beam has been selected, the UE 110 transmits the BRACH preamble that is assigned for the UE 110 to the BRACH resource that holds beam correspondence with the newly identified SS resource (SS_new). The gNB 202 receives the BRACH preamble at the BRACH resource, and the gNB 202 identifies the UE's 110 new candidate beam as SS_new.

In one embodiment, the gNB 202 manages BRACH preamble allocation separately for each BRACH resource. For example, when the gNB 202 allocates BRACH preambles for a UE 110, the gNB 202 does not allocate a BRACH preamble for the UE 110 on the BRACH resource (BRACH_old) that holds beam correspondence with the UE's 110 current SS beam (SS_old). Rather, for a BRACH resource other than the BRACH_old, the gNB 202 assigns a BRACH preamble from the BRACH preambles that are not used in the BRACH resource.

In one other embodiment, when the gNB 202 assigns a BRACH preamble(s) to a UE 110, the gNB 202 separately indicates the BRACH preamble(s) for each BRACH resource. For example, when a gNB 202 assigns the same BRACH preamble for all four BRACH resources to a UE 110, the gNB 202 repeats such indication each time (four times in this case) for each BRACH resource.

With reference to FIG. 6A, an example operation of the procedure described above is discussed. In the example as depicted, there are four SS resources (SS #1-SS #4) and four BRACH resources (BRACH #1-BRACH #4), where the it SS #i and the it BRACH #i hold beam correspondence ($1 \leq i \leq 4$). Additionally, four UEs 110 (e.g., UE1-UE4) are covered by the gNB 202, where each UE 110 is located in an area covered by a different SS resource (SS #1-SS #4). Thus, in this example, an it UE #i has a current beam that is the it SS #i, such that the it UE #i has an SS_old=the it SS #i.

The gNB 202 allocates BRACH preambles for the four UEs 110 (UE1-UE4) according to the table illustrated in FIG. 6B. As shown in the table, and for the reasons discussed above, a BRACH preamble is not assigned for the BRACH resource that corresponds to the SS resource of the UE 110 currently in use. For example, as illustrated in FIG. 6A, the SS resource for UE 110 (UE1) is SS #1, which holds beam correspondence with BRACH resource BRACH #1; the SS resource for UE 110 (UE2) is SS #2, which holds beam correspondence with BRACH resource BRACH #2, etc. Using this arrangement, only 3 BRACH preambles are necessary to support four UEs 110, thereby preventing use of one preamble and reducing overhead.

In the example, UE 110 (UE1) identifies a beam failure has occurred and suggests a new candidate beam as SS #2. The UE 110 (UE1) transmits BRACH preamble #1 at the second BRACH resource (BRACH #2). The gNB 202 receives BRACH preamble #1 at BRACH #2 and identifies that UE 110 (UE1) has a beam failure and with a new candidate beam as SS #2.

FIG. 7 illustrates an example capacity comparison between conventional resource assignment and resource assignment according to embodiments of the disclosure. In the conventional allocation of resources (where a PRACH structure is employed), the BRACH resources can support up to N UEs, as noted above. In contrast, when the UE is assigned a BRACH preamble for each BRACH resource assigned to the UE except the BRACH resource holding beam correspondence between the UE and the base station, the BRACH resources can support up to $N*(K/(K-1))$ UEs (when UEs are evenly spread out in areas covered by different SS beams), where there are N BRACH preambles available for each BRACH resource, and there are K BRACH resources with different beams. Accordingly, assuming each UE's SS_old is randomly distributed, the number of UEs supported under different (N, K) parameters are shown in the table of FIG. 7, where the average gain is shown in the bottom row. For example, if N=64 and K=2, the maximum number of BRACH resources supported is $64*2/(2-1)=128$, with an average gain of 87.6%.

In one embodiment, in case UEs are not evenly distributed, the number of UEs that are supported is restricted by a BRACH resource such that the maximum number of BRACH preambles are allocated.

Figures 8A, 8B:
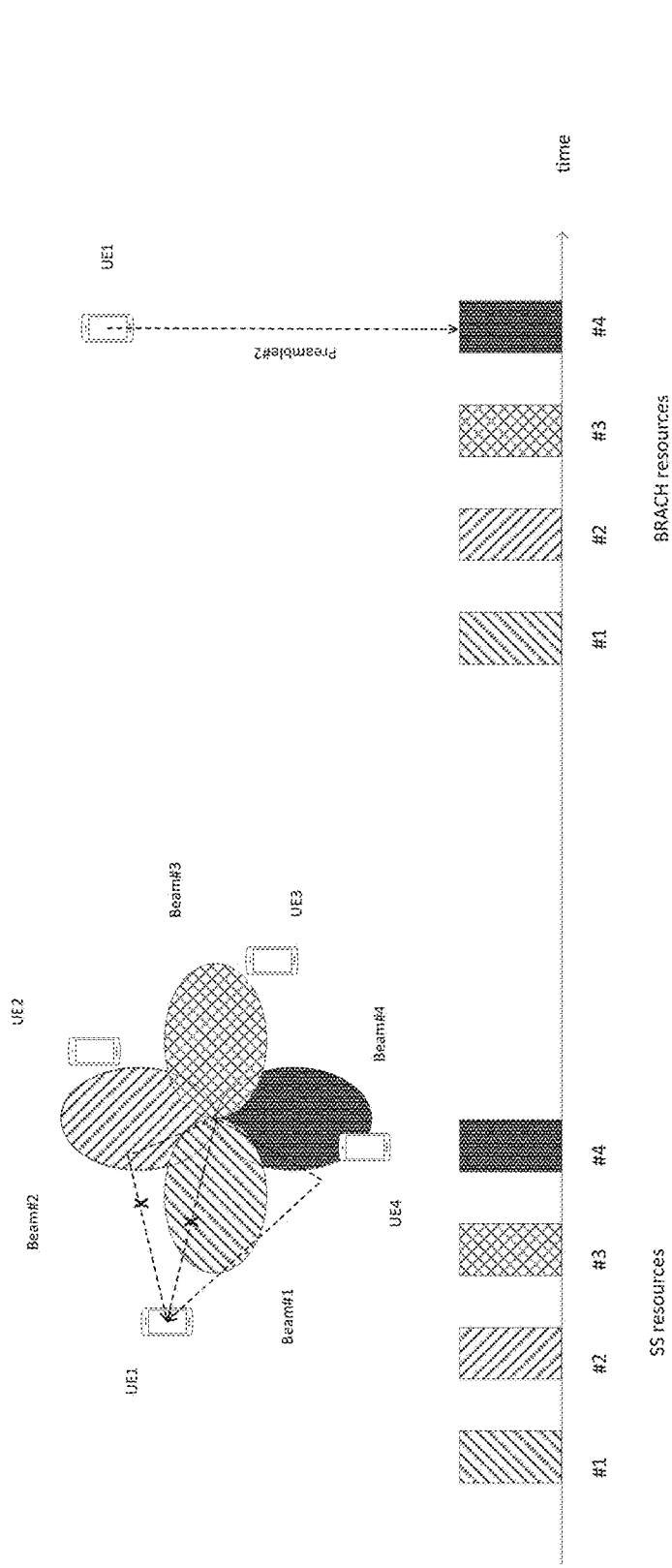
FIGS. 8A and 8B illustrate an example assignment of more than one resource to a UE for beam failure transmission.

FIGS. 8A and 8B illustrate an example assignment of more than one resource to a UE for beam failure transmission. In the disclosed embodiments, the procedures are implemented by one of the base station and/or user equipment. However, it is appreciated that the procedure may be implemented by any component or device disclosed in any one or more of the figures, and that the disclosed embodiments are non-limiting.

In the example embodiment, a UE 110 (e.g., UE1-UE4) has more than one SS resource (e.g., Beam #1 and Beam #2) currently in use. In this case, the gNB 202 does not allocate a BRACH preamble for the UE 110 on BRACH resources that hold beam correspondence with SS resources currently in use by the UE 110, as explained in the example that follows.

For purposes of the example, there are four SS resources (SS #1-SS #4) and four BRACH resources (BRACH #1-BRACH #4), where the it SS #i and the it BRACH #i hold beam correspondence ($1 \leq i \leq 4$). Additionally, four UEs 110 (e.g., UE1-UE4) are covered by the gNB 202, where each UE 110 has two SS resources (e.g., two of SS #1-SS #4) being used. For example, UE 110 (UE1) is covered by Beam #1 and Beam #2. Thus, UE #i has a current beam that is SS #[mod(i−1,4)+1], and SS #[mod(i,4)+1].

The gNB 202 allocates BRACH preambles for the four UEs 110 (e.g., UE1-UE4) according to the table illustrated in FIG. 8B. As shown in the table, two BRACH preambles are not assigned for the BRACH resources that correspond to the two SS resources of the UE 110 currently in use. For example, as illustrated, the SS resources in use by UE 110 (UE1) are SS #1 and SS #2, which hold beam correspondence with BRACH resources BRACH #1 and BRACH #2. Using this arrangement, only 2 BRACH preambles are needed to support four UEs 110, thereby preventing use of two preambles and reducing overhead.

For example, UE 110 (UE1) identifies a beam failure has occurred and suggests a new candidate beam as SS #4. UE 110 (UE1) transmits BRACH preamble #2 at the fourth BRACH resource (BRACH #4), and the gNB 202 receives BRACH preamble #2 at BRACH #4 and identifies that UE 110 (UE1) has a beam failure and that the new candidate beam is SS #4.

Figure 9A:
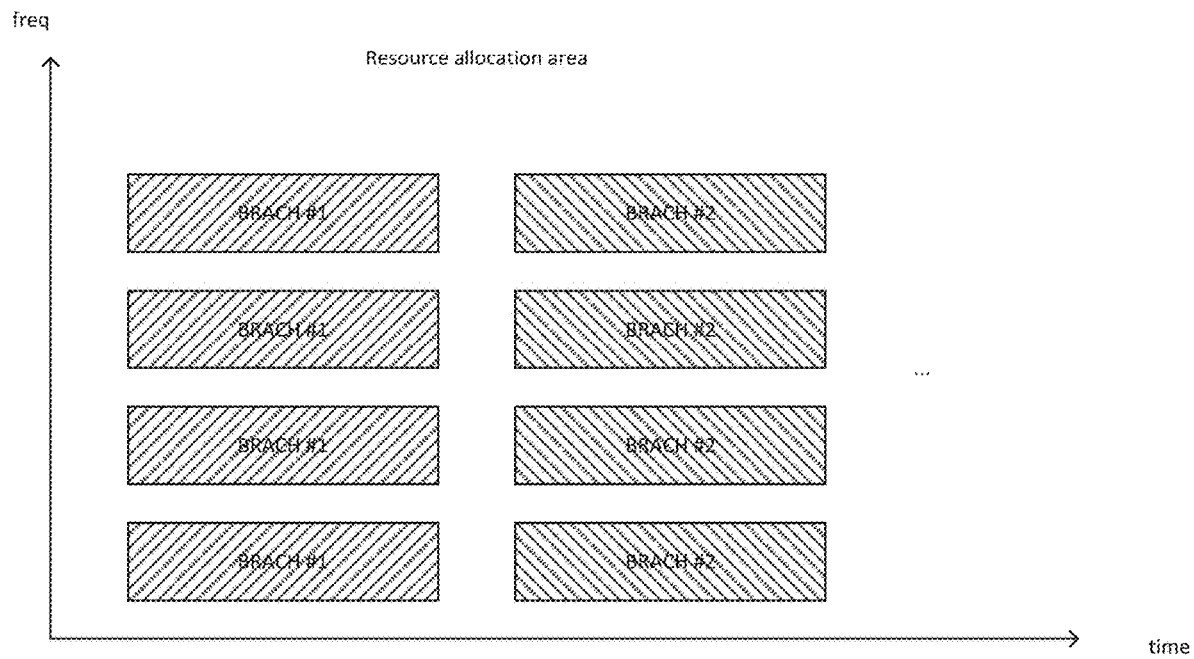
FIGS. 9A and 9B illustrate an example of resource allocation using reference signal based identification.
Figure 9B:
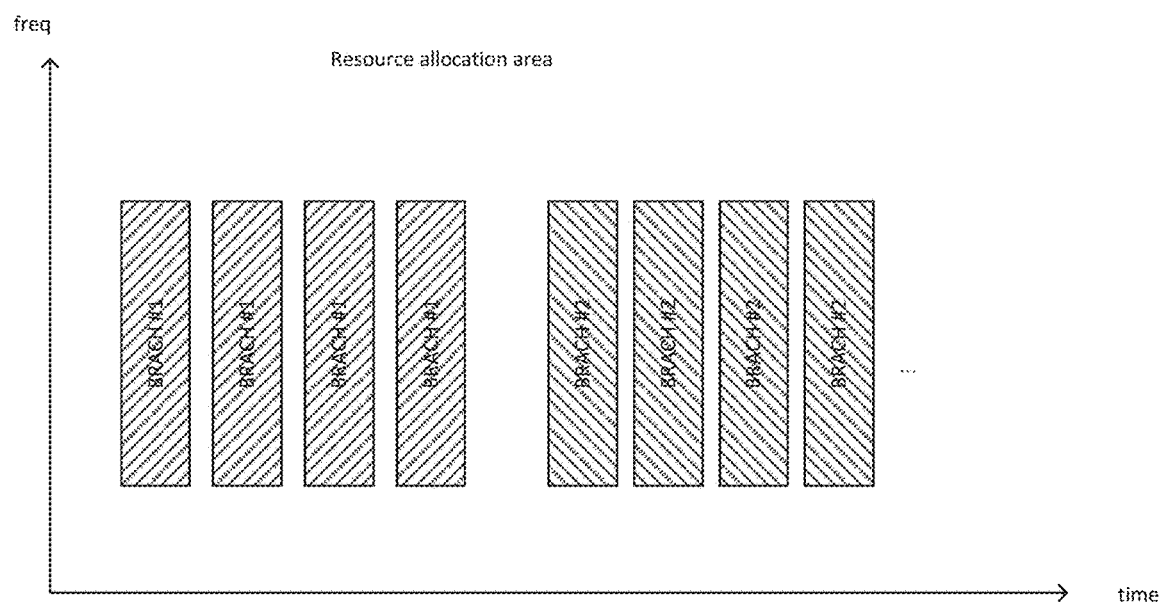

FIGS. 9A and 9B illustrate an example of resource allocation using reference signal based identification. In the disclosed embodiments, the procedures are implemented by one of the base station and/or user equipment. However, it is appreciated that the procedure may be implemented by any component or device disclosed in any one or more of the figures, and that the disclosed embodiments are non-limiting.

For purposes of discussion, it is assumed that a reference signal RS (such as a CSI-RS) is used for beam failure detection and as a new candidate beam identification RS.

With reference to the figures, FIG. 9A illustrates the assignment of unique resources in Frequency Division Multiplexing (FDM), and FIG. 9B illustrates the assignment of unique resources in Time Division Multiplexing (TDM).

In one embodiment, when a gNB 202 assigns unique resource(s) for a UE 110 within a BRACH resource, the different resources can be, for example, a different BRACH preamble, a unique BRACH preamble assigned in different time TDM (FIG. 9B), a unique BRACH preamble assigned in different frequency resource FDM (FIG. 9A), or a combination of above cases. As illustrated in the figures, each BRACH preamble depicted is a resource. For example, in FIG. 9A, the first column of BRACH #1 has four resources, each represented by an individual BRACH block.

In one other embodiment, the gNB 202 assigns SS resources to the UE 110 such that one assigned SS resource corresponds to more than one CSI-RS beam.

During operation, and before beam failure occurs, the gNB 202 transmits multiple SS resources, where each of the SS resources has a different beam direction. The gNB 202 also transmits multiple CSI-RS resources, where each of the CSI-RS resources has a different beam direction and SS resources and CSI-RS resources have a relationship where the spatial domain of each SS resource covers the spatial domain of one or more CSI-RS resources. That is, more than one CSI-RS beam may be assigned to an SS beam (not shown).

In one embodiment, the assignment of the multiple BRACH resources by the gNB 202 to the UE 110 is such that transmit beamforming (of each SS resource) and the receive beamforming (of each BRACH resource) hold beam correspondence. The UE 110 may then identify the CSI-RS resources (CRI_old) with the best signal quality by measuring the CSI-RS resources. The CRI_old is then used as the current CSI-RS resource(s). Within this context, the CRI stands for the CSI-RS Resource Indicator (CRI).

The SS resources may be categorized into two groups: (1) a first group of SS resources that do not cover the spatial domain of current CSI-RS resources (CRI_old), and (2) a second group of SS resources that cover the spatial domain of at least one of current CSI-RS resources (CRI_old).

For a BRACH resource that holds beam correspondence with the first group of SS resources, the gNB 202 assigns the UE 110 one or more resources within the BRACH resource, wherein the number of resources corresponds to the number of CSI-RS resources within the SS resource. For a BRACH resource that holds beam correspondence with the second group of SS resources, the gNB 202 assigns the UE 110 one or more resources within the BRACH resource, wherein the number resources corresponds to the number of CSI-RS resources within the SS resource that are not any of current CSI-RS resource(s) (CRI_old). In one embodiment, the resources assigned to the UE 110 on different BRACH resource can be different.

The UE 110 may then identify when a beam failure occurs by measuring the CSI-RS resources and identify another CSI-RS resource (CRI_new) as a new candidate beam. As explained above, new candidate beams may be selected based on the best signal quality amongst the available beams.

At a BRACH resource that holds beam correspondence to the SS resource that covers CRI_new, the UE 110 transmits the resource (preamble) that has been assigned to the UE 110 for the CRI_new at the BRACH resource. The gNB 202 receives the resource at the BRACH resource and identifies the UE's 110 new candidate beam as CRI_new.

FIG. 9C illustrates allocation of BRACH preambles as resources for each user equipment when employing reference beam identification. In the example embodiment, it is assumed for purposes of discussion: four SS resources and four BRACH resources exist, where SS #i and BRACH #i hold beam correspondence ($1 \leq i \leq 4$); each SS resource (SS #i) covers two CSI-RS resources (More than one CSI-RS beam may be covered by a single SS beam since the CSI-RS beam is narrower than the SS beam. Accordingly, a transmit beam at the gNB for SS #i covers a transmit beam for the $(2(i-1)+1)^{th}$ and $(2(i-1)+2)^{th}$ CSI-RS resources (the two covered resources). For example, SS #1 covers CRI #1 and 2, SS #2 covers CRI #3 and 4, SS #3 covers CRI #5 and 6 and SS #4 covers CRI #7 and 8); eight UEs are covered by a gNB; each of the eight UEs are located in a coverage area that is covered by a different CSI-RS resource; and UE #i's current beam is CRI #i (i.e., UE #i's CRI_old=CRI #i).

As illustrated in the table of FIG. 9C, there are eight UEs 110 (UE1-UE8), in which there are four BRACH resources (BRACH #1-BRACH #4) having beam correspondence with four SS resources (SS #1-SS #4), where each SS resource covers two CSI-RS resources. For example, UE 110 (UE1) has two beams (CRI #1, CR #2) which are covered by SS #1, where SS #1 holds beam correspondence with BRACH #1 and the current UE 110 (UE1) beam is CRI #1. Accordingly, when the gNB 202 assigns a BRACH preamble (preamble #1) as a resource within BRACH #1 for UE 110 (UE1), no BRACH preamble is assigned to CRI #1 (since no preamble is assigned on the current beam) and the BRACH preamble (preamble #1) is assigned to CRI #2. Otherwise, for UE 110 (UE1), the gNB 202 assigns two BRACH preambles as resources within a BRACH #i (BRACH #2, BRACH #3, BRACH #4) wherein each BRACH preamble is assigned to each CRI within the BRACH #i.

Similarly, for UE 110 (UE2), the gNB 202 assigns a BRACH preamble (preamble #2) as a resource for CRI #1 within BRACH #1, except for the current beam (in this case, CRI #2). Otherwise, for UE 110 (UE2), the gNB 202 assigns two BRACH preambles as resources within a BRACH #i (BRACH #2, BRACH #3, BRACH #4). The gNB 202 assigns BRACH preambles for each of UEs 110 (UE3-UE8) using a similar methodology.

By applying the methodology described above, and as illustrated in the table of FIG. 9C, only fourteen BRACH preambles are necessary (as opposed to sixteen preambles that would be required using conventional methodologies) to support eight UEs 110 with two CSI-RS resources in each SS resource (since the current beam is not assigned a BRACH preamble).

As an example, when a UE 110 (UE1) identifies that a beam failure occurs, the UE 110 (UE1) provides a new candidate beam (in this case, CRI #7) to the gNB 202. The UE110 (UE1) transmits BRACH preamble #1 at BRACH #4 (since BRACH #4 covers CRI #7), and the gNB 202 receives BRACH preamble #1 at BRACH #4, identifies that a beam failure has occurred for UE 110 (UE1) and identifies the new candidate beam of CRI #7 based on the preamble transmitted by the UE 110 (UE1).

Figure 10:
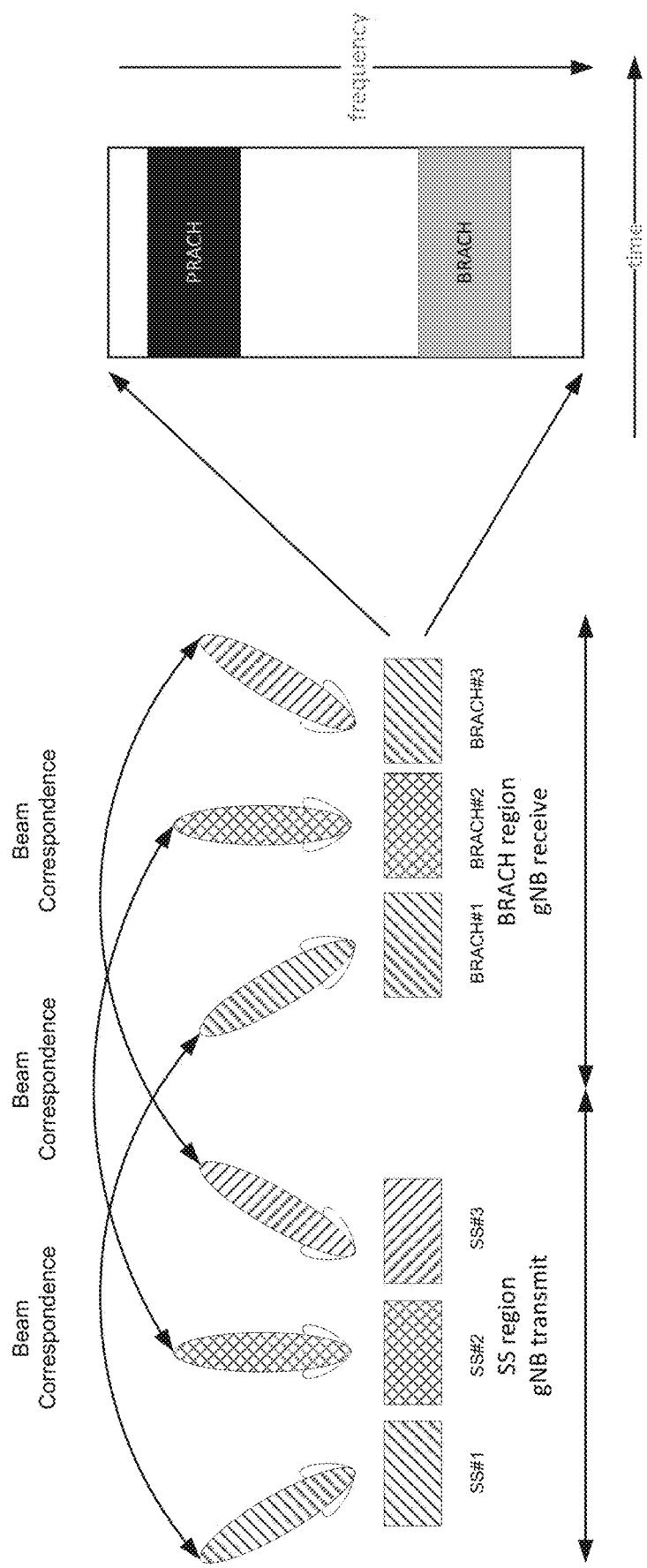
FIG. 10 illustrates a beam failure recovery request transmission based on SS-CSI-RS Association.

FIG. 10 illustrates a beam failure recovery report transmission based on a reference signal association.

In RAN1 Chairman's Notes RAN1_88b, 3GPP TSG RAN WG1 Meeting #88b, Spokane, USA, 3-7 Apr. 2017, it was agreed upon that a "beam failure detection RS at least includes periodic CSI-RS for beam management." In RAN1 Chairman's Notes RAN1_89, 3GPP TSG RAN WG1 Meeting #89, Hangzhou, China, 15-19 May 2017, for BFRR transmission, it has been agreed upon that "when beam failure is detected and candidate beam is identified at least for the case when only CSI-RS is used for new candidate beam identification." Accordingly, a newly identified beam index n, includes at least a CSI-RS beam index, e.g., CRI, at the UE 110.

In RAN1 Chairman's Notes RAN1_89, 3GPP TSG RAN WG1 Meeting #89, Hangzhou, China, 15-19 May 2017, it was agreed upon to "Support spatial QCL [(quasi-colocation)] assumption between antenna port(s) within a CSI-RS resource(s) and antenna port of an SS Block (or SS block time index) of a cell," while "Configuration of QCL for UE specific NR-PDCCH is by RRC and MAC-CE signaling." For example, assume a gNB 202 maintains a set of M SS signals for synchronization, $SS_1, \ldots, SS_m, \ldots, SS_M$. It follows that for any set of CSI-RS beams, e.g. $CRI_1, \ldots, CRI_n, \ldots$, gNB, can signal to the UE 110 the QCL relationship between CSI-RS and SS. As a result, from the newly identified beam index n, UE 110 can infer the corresponding SS with index m, such that $SS_m$ and $CRI_n$ is spatially QCLed.

In one embodiment, a single SS signal may hold a spatial QCL relationship with more than one CSI-RS signals. That is, a single SS signal may have a wider beam width than a single CSI-RS signal, as noted above. If $\phi_m$ is the set of CSI-RS signals (without respect to order) that hold a spatial QCL relationship with $SS_m$. Then, without loss of generality, let $CRI_n$ be the $i^{th}$ CSI-RS within the signal set $\phi_m$. Since n can be uniquely identified by the pair {m,i}, it is clear that in order to for gNB 202 to obtain the newly identified beam index n, it is sufficient for UE 110 to signal the SS index m for which $CRI_n$ is spatially QCLed with, as well as the secondary index i of $CRI_n$ within the signal set $\phi_m$.

In RAN1 Chairman's Notes RAN1_89, 3GPP TSG RAN WG1 Meeting #89, Hangzhou, China, 15-19 May 2017, it was agreed upon to support "Non-contention based channel based on PRACH, which uses a resource orthogonal to resources of other PRACH transmissions, at least for FDM case," as shown in FIG. 12 where the PRACH resource for initial access is FDM'ed with the BRACH (BFR RACH) resource for BFR (beam failure recover). In one embodiment, the diagram illustrates an SS region where multiple SS signals (SS #1-SS #3) are transmitted by the gNB 202 using multiple transmit precoders, as well as a BRACH region where multiple BRACH resources (BRACH #1-BRACH #3) are allocated together with PRACH resources in a FDM manner while gNB 202 receives using multiple receive precoders/combiners. For each SS signal using a particular transmit precoder, there is a unique BRACH resource using a beam corresponding receiver combiner with a fixed relative time-frequency relation. In other words, for M SS signals $SS_1, \ldots, SS_m, \ldots, SS_M$, there are M BRACH resources $BRACH_1, \ldots, BRACH_m, \ldots, BRACH_M$ with a one-to-one mapping relationship.

From the perspective of the UE 110, the SS index m (for which $CRI_n$ is spatially QCLed) can be signaled in an implicit manner by sending the BFRR on the mth BRACH resource $BRACH_m$ which holds a one-to-one mapping relationship with $SS_m$. By analyzing which BRACH resource is being used, gNB 202 can detect the SS index m.

In one embodiment, the secondary index i of $CRI_n$ within the signal set Om can be signaled separately, using several different methods. For example, the secondary index i can be signaled explicitly when the UE 110 has obtained a transmission grant. In another example, each UE 110 may be assigned multiple unique sequences in advance with each sequence representing one secondary index within the signal set $\phi_m$. As a result, the secondary index i can be signaled to gNB 202 implicitly by selection of a proper sequence at the UE side. By analyzing the preamble sequence being used, gNB 202 can detect the UE 110 identity and the secondary index i.

In still another example, each UE 110 may be assigned multiple BRACH sub-resources, on which the preamble sequence may be transmitted, where each BRACH sub-resource represents one secondary index within the signal set $\phi_m$. As a result, the secondary index i can be signaled to gNB 202 implicitly by selection of a proper BRACH resource at the UE side. By analyzing the BRACH resource being used, gNB 202 can detect the secondary index i.

Additional embodiments may include any one of the following aspects: the resource from the group of one or more resources are different BRACH preambles; the resources from the group of one or more resources are a BRACH preamble assigned in different time slots assigned within the BRACH resource; the resources from the group of one or more resources are a BRACH preamble assigned in different frequency blocks assigned within the BRACH resource; the CSI-RS is used as the beam failure detection reference signal; the information on mapping between one and the number of the beam failure detection reference signals within each BRACH resource is predetermined without explicit indication; the $k^{th}$ beam failure detection reference signal is mapped to mod(K, N_R) resource assigned to the UE, wherein K denotes the third number of the beam failure detection reference signals for each BRACH resource, N_R denotes the resources from the group of one or more resources assigned to the UE, and mod(x, y) operator denotes the remainder after division of x by y.

FIGS. 11A-11D illustrate flow diagrams of assigning resources to user equipment for transmission of a beam failure recovery request. In the flow diagrams, and for purposes of discussion, the procedures are implemented by one of the base station or user equipment. However, it is appreciated that the procedure may be implemented by any component or device disclosed in any one or more of the figures, and that the disclosed embodiments are non-limiting.

Figure 11A:
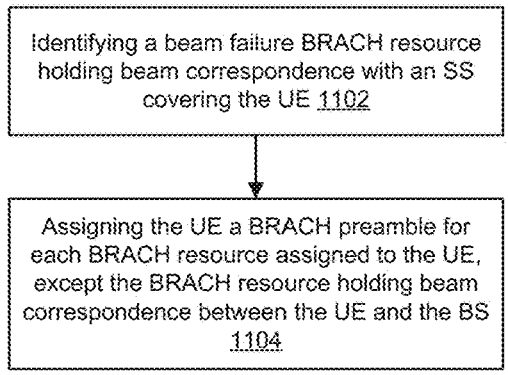
FIGS. 11A-11F illustrate flow diagrams of assigning resources to user equipment for transmission of a beam failure recovery request.

At FIG. 11A, resources are assigned to user equipment 110 for a beam failure recovery by a base station 202. At 1102, a beam failure random access channel (BRACH) resource holding beam correspondence with a synchronization signal (SS) block resource covering the user equipment 110 is identified, and at 1104 the user equipment 110 is assigned a BRACH preamble for each BRACH resource assigned to the user equipment 110, except the BRACH resource holding beam correspondence between the base station's SS block resource covering the user equipment 110.

Figure 11B:
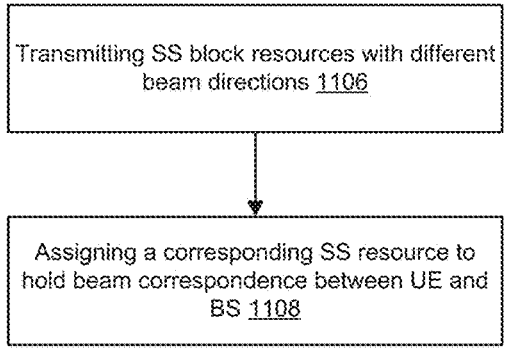

In one embodiment, with reference to FIG. 11B, at 1106, the base station 202 transmits the SS block resources to the user equipment 110, where each of the SS block resources has a different beam direction, and for each BRACH resource assigned to the user equipment 110, a corresponding one of the Tx beams of each SS resources and the Tx beam of each BRACH resource hold beam correspondence.

Figure 11C:
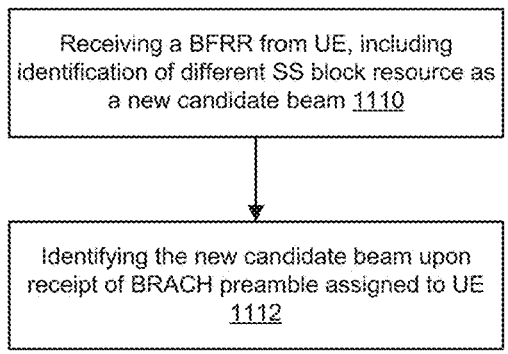

In one embodiment, with reference to FIG. 11C, at 1110, the base station 202 receives a beam failure recovery request (BFRR) from the user equipment 110, including identification of a different SS block resource as a new candidate beam (which does not include the SS block resource of the current beam), upon detection of a beam failure between the base station and the user equipment 110. At 1112, the base station 202 identifies the new candidate beam upon receiving a BRACH preamble assigned for the user equipment 110 at the BRACH resource.

Figure 11D:
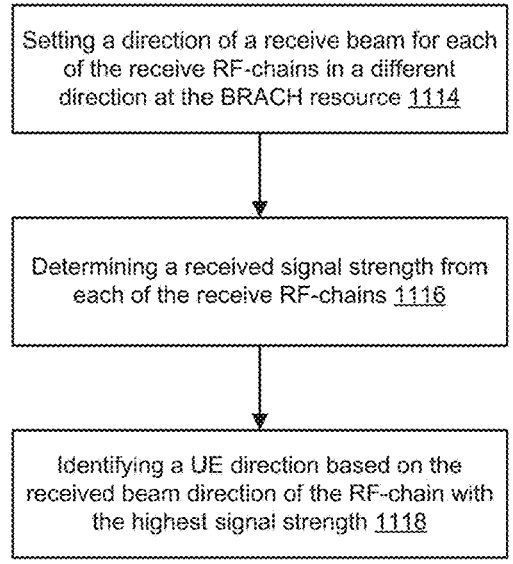

In one embodiment, with reference to FIG. 11D, the base station 202 sets a direction of a receive beam for each of the receive RF-chains in a different direction at the BRACH resource, at 1114. At 1116, the base station 202 determines a received signal strength from each of the receive RF-chain when receiving the one of the resources from a group of the resources, and identifies a user equipment 110 direction based the receive beam direction of the receive RF-chain that has the highest received signal strength at 1118.

Figure 11E:
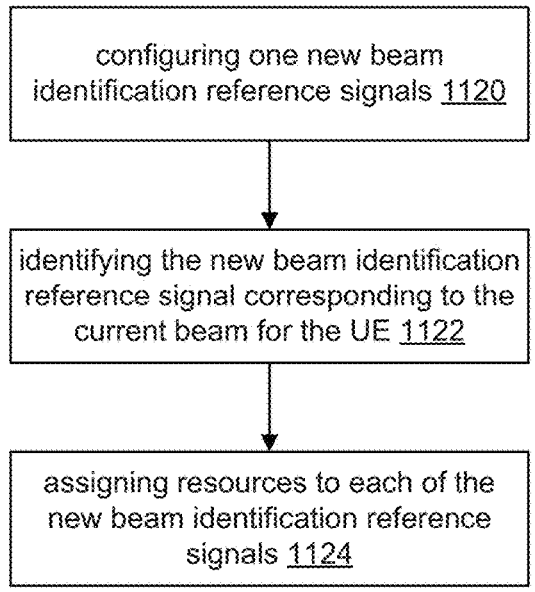

In another embodiment, with reference to FIG. 11E, the base station 202 configures new beam identification reference signals at 1120, and identifies the new beam identification reference signal corresponding to the current beam for the user equipment 110 at 1122. The base station 202 then assigns resources to each of the new beam identification reference signals excluding the new beam identification reference signal corresponding to the current beam of the user equipment 110 at 1124.

Figure 11F:
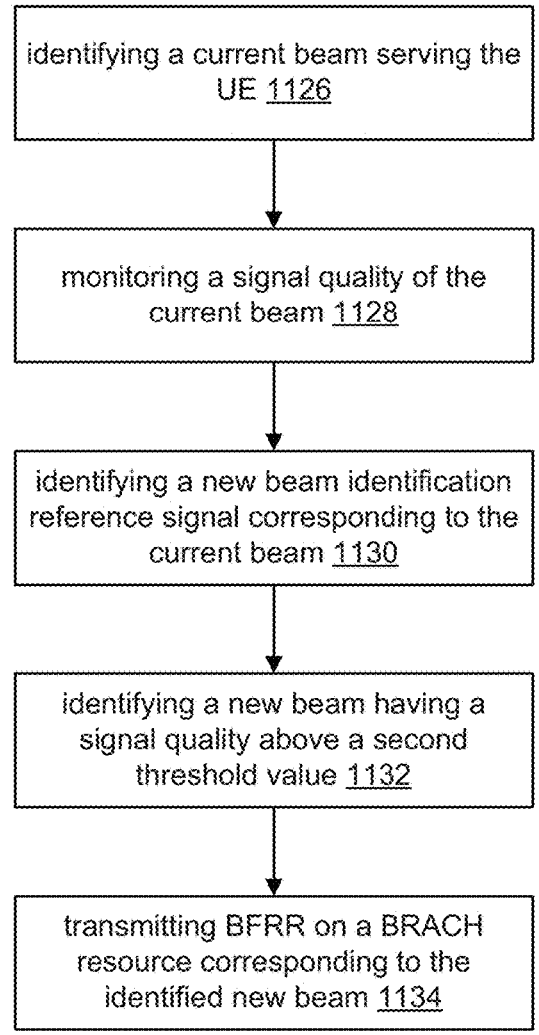

In still another embodiment, with reference to FIG. 11F, the user equipment 110 identifies a current beam serving the user equipment 110 at 1126, and monitors a signal quality of the current beam to identify when the signal quality falls below a first threshold value at 1128. The user equipment 110, at 1130, identifies a new beam identification reference signal corresponding to the current beam, and identifies a new beam having a signal quality above a second threshold value from new beam identification reference signals, excluding the new beam identification reference signal corresponding to the current beam at 1132. Finally, the user equipment 110 transmits a beam failure recovery request (BFRR) on a beam failure random access channel (BRACH) resource corresponding to the identified new beam at 1134.

Figure 12A:
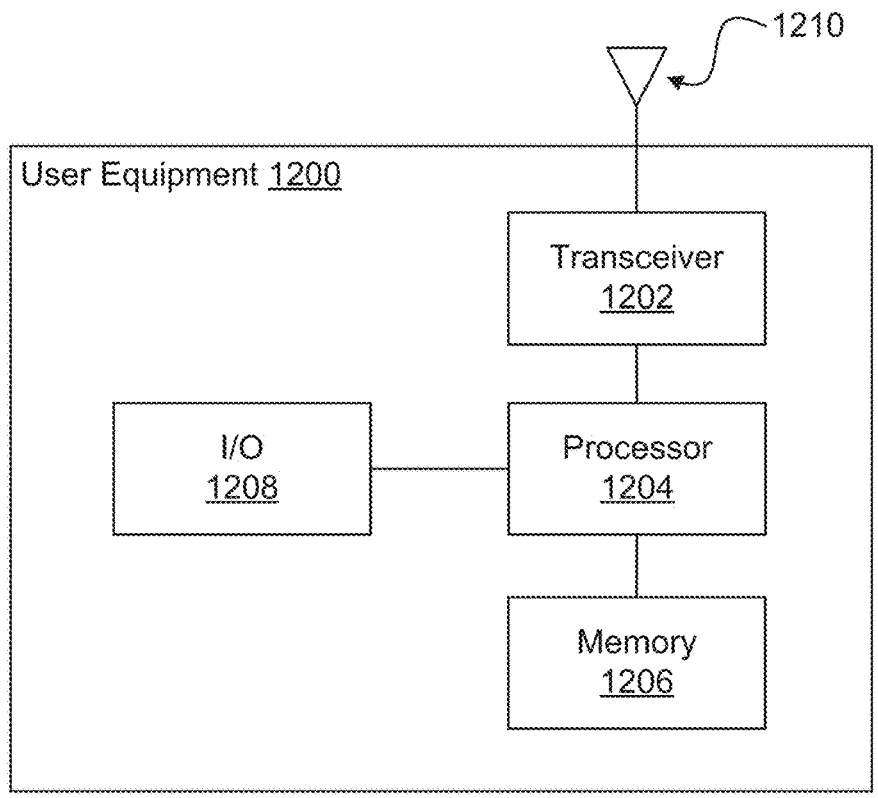
FIG. 12A illustrates example user equipment that may implement the methods and teachings according to this disclosure.

FIG. 12A illustrates example user equipment that may implement the methods and teachings according to this disclosure. As shown in the figure, the UE 1200 includes at least one processor 1204. The processor 1204 implements various processing operations of the UE 1200. For example, the processor 1204 may perform signal coding, data processing, power control, input/output processing, or any other functionality enabling the UE 1200 to operate in the system 100 (FIG. 1). The processor 1204 may include any suitable processing or computing device configured to perform one or more operations. For example, the processor 1204 may include a microprocessor, microcontroller, digital signal processor, field programmable gate array, or application specific integrated circuit.

The UE 1200 also includes at least one transceiver 1202. The transceiver 1202 is configured to modulate data or other content for transmission by at least one antenna 1210. The transceiver 1202 is also configured to demodulate data or other content received by the at least one antenna 1210. Each transceiver 1202 may include any suitable structure for generating signals for wireless transmission and/or processing signals received wirelessly. Each antenna 1210 includes any suitable structure for transmitting and/or receiving wireless signals. It is appreciated that one or multiple transceivers 1202 could be used in the UE 1200, and one or multiple antennas 1210 could be used in the UE 1200. Although shown as a single functional unit, a transceiver 1202 may also be implemented using at least one transmitter and at least one separate receiver.

The UE 1200 further includes one or more input/output devices 1208. The input/output devices 1208 facilitate interaction with a user. Each input/output device 1208 includes any suitable structure for providing information to or receiving information from a user, such as a speaker, microphone, keypad, keyboard, display, or touch screen.

In addition, the UE 1200 includes at least one memory 1206. The memory 1206 stores instructions and data used, generated, or collected by the UE 1200. For example, the memory 1206 could store software or firmware instructions executed by the processor(s) 1204 and data used to reduce or eliminate interference in incoming signals. Each memory 1206 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 12B:
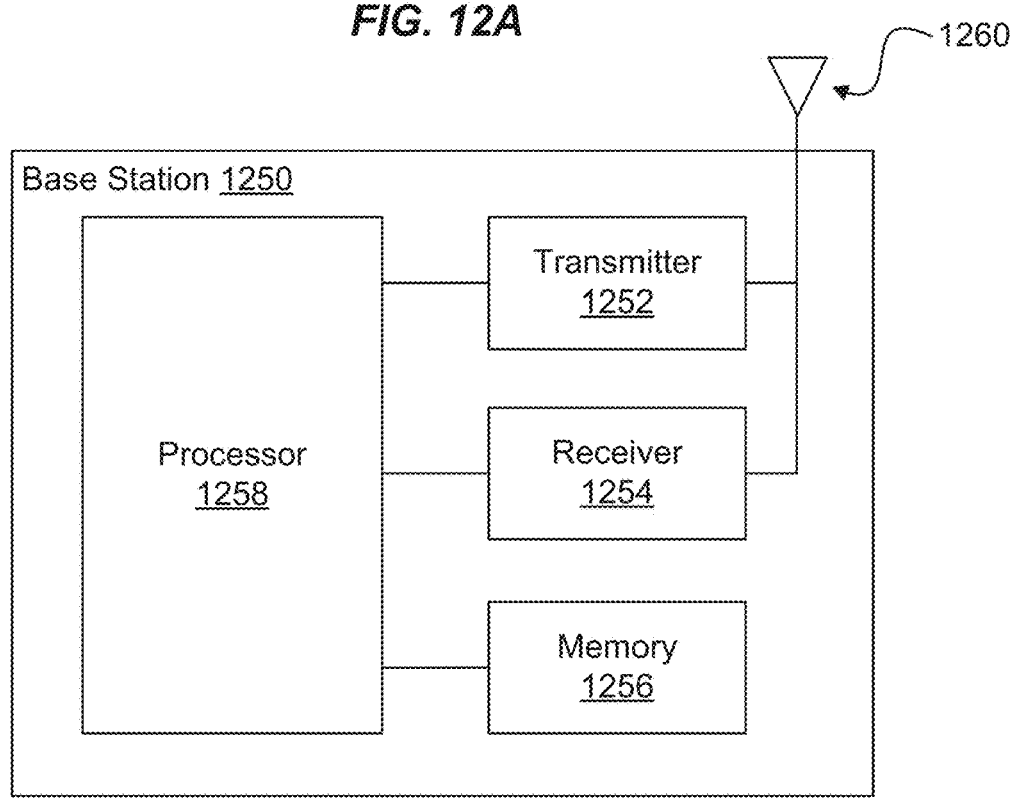
FIG. 12B illustrates example base station that may implement the methods and teachings according to this disclosure.

FIG. 12B illustrates example base station that may implement the methods and teachings according to this disclosure. As shown in the figure, the base station 1250 includes at least one processor 1258, at least one transmitter 1252, at least one receiver 1254, one or more antennas 1260, and at least one memory 1256. The processor 1258 implements various processing operations of the base station 1250, such as signal coding, data processing, power control, input/output processing, or any other functionality. Each processor 1258 includes any suitable processing or computing device configured to perform one or more operations. Each processor 1258 could, for example, include a microprocessor, microcontroller, digital signal processor, field programmable gate array, or application specific integrated circuit.

Each transmitter 1252 includes any suitable structure for generating signals for wireless transmission to one or more UEs or other devices. Each receiver 1254 includes any suitable structure for processing signals received wirelessly from one or more UEs or other devices. Although shown as separate components, at least one transmitter 1252 and at least one receiver 1254 could be combined into a transceiver. Each antenna 1260 includes any suitable structure for transmitting and/or receiving wireless signals. While a common antenna 1260 is shown here as being coupled to both the transmitter 1252 and the receiver 1254, one or more antennas 1260 could be coupled to the transmitter(s) 1252, and one or more separate antennas 1260 could be coupled to the receiver(s) 1254. Each memory 1256 includes any suitable volatile and/or non-volatile storage and retrieval device(s).

Figure 13:
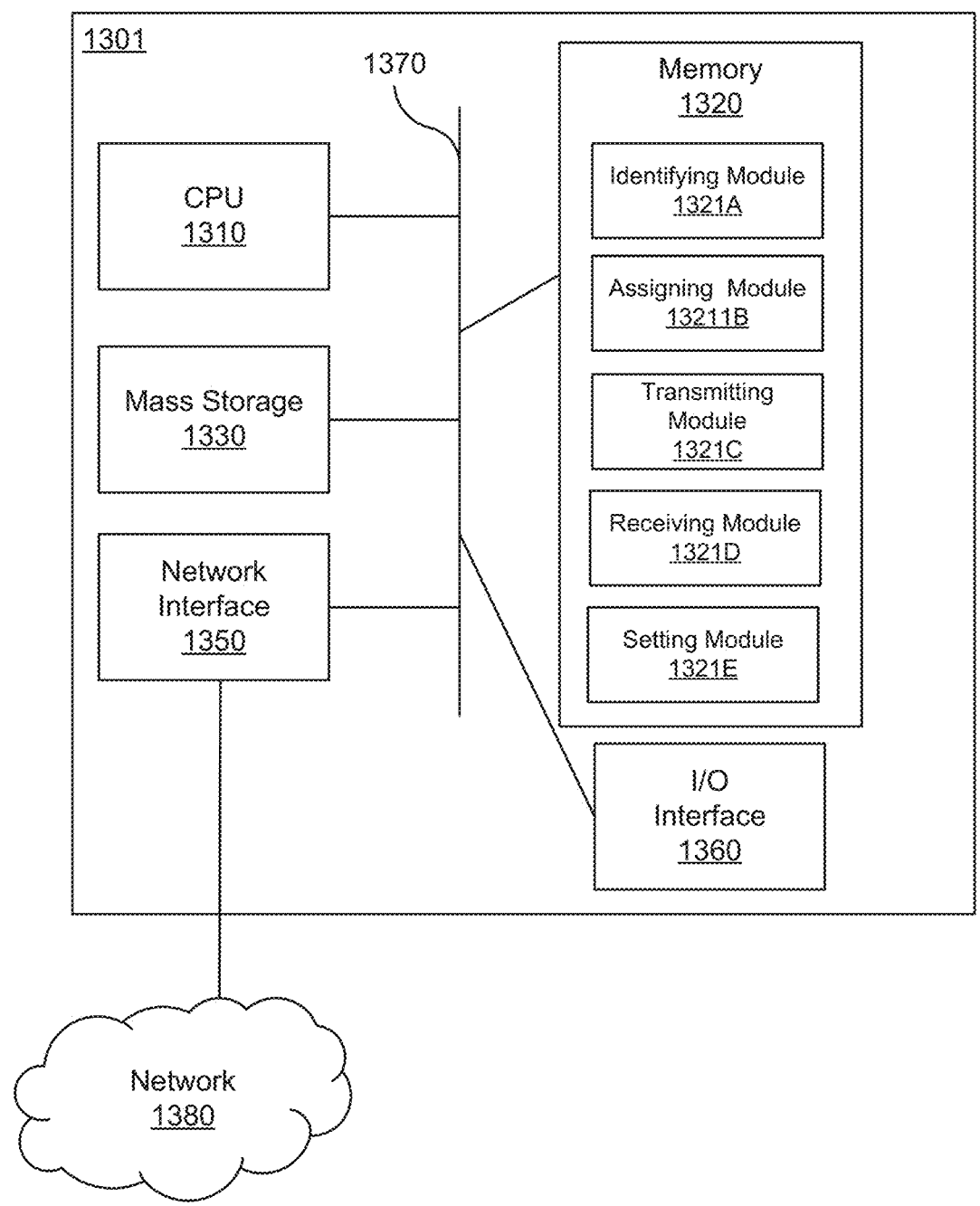
FIG. 13 illustrates a block diagram of a network system that can be used to implement various embodiments.

FIG. 13 is a block diagram of a network device that can be used to implement various embodiments. Specific network devices may utilize all of the components shown, or only a subset of the components, and levels of integration may vary from device to device. Furthermore, the network device 1300 may contain multiple instances of a component, such as multiple processing units, processors, memories, transmitters, receivers, etc. The network device 1300 may comprise a processing unit 1301 equipped with one or more input/output devices, such as network interfaces, storage interfaces, and the like. The processing unit 1301 may include a central processing unit (CPU) 1310, a memory 1320, a mass storage device 1330, and an I/O interface 1360 connected to a bus 1370. The bus 1370 may be one or more of any type of several bus architectures including a memory bus or memory controller, a peripheral bus or the like.

The CPU 1310 may comprise any type of electronic data processor. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs. In embodiments, the memory 1320 is non-transitory. In one embodiment, the memory 1320 includes an identifying module 1321A, an assigning module 1321B, a transmitting module 1321C, a receiving module 1321D and a setting module 1321E.

The mass storage device 1330 may comprise any type of storage device configured to store data, programs, and other information and to make the data, programs, and other information accessible via the bus 1370. The mass storage device 1330 may comprise, for example, one or more of a solid state drive, hard disk drive, a magnetic disk drive, an optical disk drive, or the like.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the networks 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A base station, comprising:
a non-transitory memory storage comprising instructions;
one or more processors in communication with the memory, wherein the one or more processors cause the base station to execute the instructions to:
communicate with a user equipment (UE) over one or more current beams;
transmit a plurality of reference signals, one or more first reference signals of the plurality of reference signals corresponding to the current beams; and
transmit to the UE an assignment of resources for beam failure recovery for the UE, the assignment indicating one or more resources for each of a set of the plurality of reference signals excluding the first reference signals.

2. The base station of claim 1, wherein
the assigned resources comprise preambles, and
the one or more processors further cause the base station to execute the instructions to receive, from the UE, one of the preambles.

3. The base station of claim 2, wherein the one or more processors further cause the base station to execute the instructions to determine a beam for future communication with the UE based at least on the received preamble.

4. The base station of claim 1, wherein the plurality of reference signals comprise at least one channel state information reference signal and at least one synchronization signal.

5. The base station of claim 1, wherein a spatial domain of at least one of the set of reference signals covers a spatial domain of one or more other reference signals in the set of reference signals.

6. The base station of claim 1, wherein a spatial domain of at least one of the set of reference signals assigned a resource covers a spatial domain of at least one of the current beams.

7. The base station of claim 1, wherein each of the set of the reference signals has a different beam direction.

8. The base station of claim 1, wherein there are more than one current beams.

9. The base station of claim 1, wherein the assigned resources are non-contention based resources.

10. A method of beam failure recovery for a base station, the method comprising:
communicating with a user equipment (UE) over one or more current beams;
transmitting, by the base station, a plurality of reference signals, one or more first reference signals of the plurality of reference signals corresponding to the current beams; and
transmitting, by the base station and to the UE, an assignment of resources for beam failure recovery for the UE, the assignment indicating one or more resources for each of a set of the plurality of reference signals excluding the first reference signals.

11. The method of claim 10, wherein
the assigned resources comprise preambles, and
the method further comprises receiving, by the base station and from the UE, one of the preambles.

12. The method of claim 11, further comprising determining a beam for future communication with the UE based at least on the received preamble.

13. The method of claim 10, wherein the plurality of reference signals comprise at least one channel state information reference signal and at least one synchronization signal.

14. The method of claim 10, wherein a spatial domain of at least one of the set of reference signals covers a spatial domain of one or more other reference signals in the set of reference signals.

15. The method of claim 10, wherein a spatial domain of at least one of the set of reference signals assigned a resource covers a spatial domain of at least one of the current beams.

16. The method of claim 10, wherein each of the set of the reference signals has a different beam direction.

17. The method of claim 10, wherein there are more than one current beams.

18. The method of claim 10, wherein the assigned resources are non-contention based resources.

19. A non-transitory computer-readable medium storing computer instructions for beam failure recovery by a base station that, when executed by one or more processors of the base station, cause the base station to perform the steps of:
communicating with a user equipment (UE) over one or more current beams;
transmitting a plurality of reference signals, one or more first reference signals of the plurality of reference signals corresponding to the current beams; and
transmitting to the UE an assignment of resources for beam failure recovery for the UE, the assignment indicating one or more resources for each of a set of the plurality of reference signals excluding the first reference signals.

20. The non-transitory computer-readable medium of claim 19, wherein
the assigned resources comprise preambles, and
the one or more processors further cause the base station to perform the step of receiving, from the UE, one of the preambles.

21. The non-transitory computer-readable medium of claim 20, wherein the one or more processors further cause the base station to perform the step of determining a beam for future communication with the UE based at least on the received preamble.

22. The non-transitory computer-readable medium of claim 19, wherein the plurality of reference signals comprise at least one channel state information reference signal and at least one synchronization signal.

23. The non-transitory computer-readable medium of claim 19, wherein a spatial domain of at least one of the set of reference signals covers a spatial domain of one or more other reference signals in the set of reference signals.

24. The non-transitory computer-readable medium of claim 19, wherein a spatial domain of at least one of the set of reference signals assigned a resource covers a spatial domain of at least one of the current beams.

25. The non-transitory computer-readable medium of claim 19, wherein each of the set of the reference signals has a different beam direction.

26. The non-transitory computer-readable medium of claim 19, wherein there are more than one current beams.

27. The non-transitory computer-readable medium of claim 19, wherein the assigned resources are non-contention based resources.

* * * * *